United States Patent
Heathcock et al.

(10) Patent No.: US 7,458,698 B2
(45) Date of Patent: Dec. 2, 2008

(54) DECORATIVE LIGHT SYSTEM

(75) Inventors: Sarah E. Heathcock, Racine, WI (US);
Scott W. Demarest, Caledonia, WI (US);
Matthew Abbondanzio, Racine, WI
(US); Simon M. Conway, Burlington,
WI (US); Kamran Faterioun, New
Berlin, WI (US); Ronald R. Dir,
Sturtevant, WI (US); Edwin T. Horton,
Wildwood, MO (US); Kevin Harrity,
Oak Creek, WI (US); David R. Carlson,
Cedarburg, WI (US); Mark E. Johnson,
Mount Prospect, IL (US)

(73) Assignee: S.C. Johnson & Son, Inc., Racine, WI (US)

( * ) Notice: Subject to any disclaimer, the term of this patent is extended or adjusted under 35 U.S.C. 154(b) by 267 days.

(21) Appl. No.: 11/424,481

(22) Filed: Jun. 15, 2006

(65) Prior Publication Data
US 2007/0291475 A1    Dec. 20, 2007

(51) Int. Cl.
*F21V 33/00* (2006.01)
(52) U.S. Cl. .................. 362/101; 362/158; 362/183; 362/267
(58) Field of Classification Search .......... 362/101, 362/158, 183, 244, 246, 267, 555, 565, 558
See application file for complete search history.

(56) References Cited

U.S. PATENT DOCUMENTS

| | | |
|---|---|---|
| 1,956,796 A | 5/1934 | Hull |
| D119,201 S | 2/1940 | Bolton |
| 2,429,379 A | 10/1947 | Swain |
| 2,818,770 A | 1/1958 | Cilurzo |
| 3,000,774 A | 9/1961 | Swedlow et al. |
| 3,119,565 A | 1/1964 | Nottingham |
| 3,205,350 A | 9/1965 | Roszkowski et al. |
| 3,218,447 A | 11/1965 | Pardue |
| 3,531,636 A | 9/1970 | Birch |
| 3,612,651 A | 10/1971 | McCurdy |
| 3,735,113 A | 5/1973 | Stott |

(Continued)

FOREIGN PATENT DOCUMENTS

DE    202005001786 U1    3/2006

(Continued)

OTHER PUBLICATIONS

PCT/US2007/013298 International Search Report & Written Opinion dated Feb. 7, 2008.

(Continued)

*Primary Examiner*—Sandra O Shea
*Assistant Examiner*—James W Cranson

(57) ABSTRACT

A portable light device is capable of generating light that is substantially uniformly distributed at its surface. The light device includes a housing having at least a translucent portion formed of a translucent material A first light source is disposed within the housing and is adapted to generate light. A first optical structure is positioned to direct at least a portion of the light from the first light source toward the housing translucent portion, and a second optical structure is positioned between the first light source and the housing translucent portion, the second optical structure being adapted to diffuse at least a portion of the light for uniform distribution across the housing translucent portion.

20 Claims, 10 Drawing Sheets

U.S. PATENT DOCUMENTS

| | | | |
|---|---|---|---|
| 3,748,457 A | 7/1973 | Balitzsky et al. | |
| 3,760,179 A | 9/1973 | Addington, Jr. | |
| 3,826,250 A | 7/1974 | Adams | |
| 223,165 A | 10/1974 | Gismondi | |
| 4,088,880 A | 5/1978 | Walsh | |
| 4,203,150 A * | 5/1980 | Shamlian | 362/183 |
| 4,234,907 A | 11/1980 | Daniel | |
| 4,305,117 A | 12/1981 | Evans | |
| 4,315,502 A | 2/1982 | Gorges | |
| 4,420,711 A | 12/1983 | Takahashi | |
| 4,450,511 A | 5/1984 | Micha | |
| 4,483,681 A | 11/1984 | Weinblatt | |
| 4,503,563 A | 3/1985 | Johnson | |
| 4,510,555 A | 4/1985 | Mori | |
| 4,519,017 A | 5/1985 | Daniel | |
| 4,528,989 A | 7/1985 | Weinblatt | |
| 4,553,534 A | 11/1985 | Stiegler | |
| 4,561,043 A | 12/1985 | Thompson | |
| 4,575,660 A | 3/1986 | Zaharchuk et al. | |
| 4,640,266 A | 2/1987 | Levy et al. | |
| 4,727,296 A | 2/1988 | Zaharchuk et al. | |
| 4,754,372 A | 6/1988 | Harrison | |
| 4,775,935 A | 10/1988 | Yourick | |
| 4,777,937 A | 10/1988 | Rush et al. | |
| 4,779,174 A | 10/1988 | Staten et al. | |
| 4,782,430 A | 11/1988 | Robbins et al. | |
| 4,875,144 A | 10/1989 | Wainwright | |
| 4,885,663 A | 12/1989 | Parker | |
| 4,892,106 A | 1/1990 | Gleeson, III | |
| 4,901,922 A | 2/1990 | Kessener et al. | |
| 4,929,021 A | 5/1990 | Kaye | |
| 4,933,815 A | 6/1990 | Parthasarathy | |
| 4,955,975 A | 9/1990 | Mori | |
| 4,965,701 A | 10/1990 | Voland | |
| 4,972,305 A | 11/1990 | Blackburn | |
| 4,974,136 A | 11/1990 | Noori-Shad | |
| 5,021,928 A | 6/1991 | Daniel | |
| 5,047,006 A | 9/1991 | Brandston et al. | |
| 5,060,119 A | 10/1991 | Parthasarathy | |
| 5,066,085 A | 11/1991 | Gimbutas | |
| 5,070,435 A | 12/1991 | Weller | |
| 5,076,747 A | 12/1991 | Cosenza | |
| 5,144,545 A | 9/1992 | Klitzing | |
| 5,149,317 A | 9/1992 | Robinson | |
| 5,183,323 A | 2/1993 | Daniel | |
| 5,211,699 A | 5/1993 | Tipton | |
| 5,243,517 A | 9/1993 | Schmidt et al. | |
| 5,247,491 A | 9/1993 | Kwiatkowski | |
| 5,249,105 A | 9/1993 | Koizumi | |
| 5,255,171 A | 10/1993 | Clark | |
| 5,259,830 A | 11/1993 | Masuda | |
| 5,266,070 A | 11/1993 | Hagiwara et al. | |
| 5,276,599 A | 1/1994 | Neeley | |
| 5,292,345 A | 3/1994 | Gerardo | |
| 5,299,103 A | 3/1994 | Kielland | |
| 5,301,090 A | 4/1994 | Hed | |
| 5,318,503 A | 6/1994 | Lord | |
| 5,387,178 A | 2/1995 | Moses | |
| D356,389 S | 3/1995 | Chen | |
| 5,409,445 A | 4/1995 | Rubins | |
| 5,426,474 A | 6/1995 | Rubtsov et al. | |
| 5,432,876 A | 7/1995 | Appledorn et al. | |
| 5,441,777 A | 8/1995 | Howell | |
| 5,518,497 A | 5/1996 | Widjaja et al. | |
| 5,547,721 A | 8/1996 | Kuo | |
| 5,568,964 A | 10/1996 | Parker et al. | |
| 5,575,553 A | 11/1996 | Tipton | |
| 5,577,990 A | 11/1996 | Widjaja et al. | |
| 5,599,274 A | 2/1997 | Widjaja et al. | |
| 5,624,177 A | 4/1997 | Rosaia | |
| 5,645,578 A | 7/1997 | Daffers et al. | |
| 5,691,886 A | 11/1997 | Stacy | |
| D391,007 S | 2/1998 | Hergert | |
| 5,725,472 A | 3/1998 | Weathers | |
| 5,743,616 A | 4/1998 | Giuliano et al. | |
| 5,785,407 A | 7/1998 | Ratcliffe et al. | |
| 5,823,431 A | 10/1998 | Pierce | |
| 5,823,652 A | 10/1998 | Vann | |
| 5,842,771 A | 12/1998 | Thrasher et al. | |
| 5,860,724 A | 1/1999 | Cheng | |
| 5,879,068 A | 3/1999 | Menashrov et al. | |
| 5,896,457 A | 4/1999 | Tyrrel | |
| 5,931,558 A | 8/1999 | Chen | |
| 5,934,796 A | 8/1999 | Quereau | |
| 5,951,278 A | 9/1999 | Young et al. | |
| 5,980,065 A | 11/1999 | Wooderson | |
| 5,989,655 A | 11/1999 | Meng | |
| 6,016,038 A | 1/2000 | Mueller et al. | |
| 6,030,108 A | 2/2000 | Ishiharada et al. | |
| 6,030,264 A | 2/2000 | Carter | |
| 6,065,848 A | 5/2000 | Tucker et al. | |
| 6,076,741 A | 6/2000 | Dandrel et al. | |
| 6,132,056 A | 10/2000 | Ruthenberg | |
| 6,150,774 A | 11/2000 | Mueller et al. | |
| 6,166,496 A | 12/2000 | Lys | |
| 6,211,626 B1 | 4/2001 | Lys | |
| 6,217,188 B1 | 4/2001 | Wainwright et al. | |
| 6,220,718 B1 | 4/2001 | Burgess | |
| 6,220,742 B1 | 4/2001 | Lloyd et al. | |
| 6,224,241 B1 | 5/2001 | Oswald | |
| 6,233,564 B1 | 5/2001 | Schulze | |
| 6,239,716 B1 | 5/2001 | Pross | |
| 6,241,361 B1 | 6/2001 | Thrasher et al. | |
| 6,241,362 B1 | 6/2001 | Morrison | |
| 6,247,827 B1 | 6/2001 | Carter | |
| 6,269,491 B2 | 8/2001 | Zankow | |
| 6,299,338 B1 | 10/2001 | Levinson | |
| 6,305,817 B1 | 10/2001 | Johnston | |
| 6,309,084 B1 | 10/2001 | Lin et al. | |
| 6,319,572 B1 | 11/2001 | Howell | |
| 6,336,735 B1 | 1/2002 | Eddins | |
| 6,341,874 B1 | 1/2002 | Rubin | |
| 6,341,882 B1 | 1/2002 | Lin | |
| 6,364,501 B1 * | 4/2002 | Tai | 362/122 |
| 6,375,342 B1 | 4/2002 | Koren et al. | |
| 6,393,192 B1 | 5/2002 | Koren | |
| 6,416,180 B1 | 7/2002 | Strobl | |
| 6,416,198 B1 | 7/2002 | VanderSchuit | |
| 6,433,483 B1 | 8/2002 | Michael et al. | |
| 6,453,484 B1 | 9/2002 | Pinciaro | |
| D464,762 S | 10/2002 | De Lucchi et al. | |
| 6,464,371 B2 | 10/2002 | Bender | |
| 6,479,965 B2 | 11/2002 | Barbeau et al. | |
| 6,480,649 B2 | 11/2002 | Lee | |
| 6,488,393 B1 | 12/2002 | Burnham | |
| 6,494,851 B1 | 12/2002 | Becher | |
| 6,498,440 B2 | 12/2002 | Stam et al. | |
| 6,502,953 B2 | 1/2003 | Hajianpour | |
| 6,511,196 B1 | 1/2003 | Hoy | |
| 6,513,954 B2 | 2/2003 | Ebersole | |
| 6,543,925 B2 | 4/2003 | Kuykendal | |
| 6,544,165 B1 | 4/2003 | McNew | |
| 6,545,428 B2 | 4/2003 | Davenport et al. | |
| 6,558,022 B2 | 5/2003 | Kawahara | |
| 6,567,009 B2 | 5/2003 | Ohishi et al. | |
| 6,577,080 B2 | 6/2003 | Lys | |
| 6,584,346 B2 | 6/2003 | Flugger | |
| 6,607,499 B1 | 8/2003 | Becher | |
| 6,608,453 B2 | 8/2003 | Morgan et al. | |
| D479,356 S | 9/2003 | Baarman et al. | |
| 6,628,885 B1 | 9/2003 | Wilkie et al. | |
| 6,629,772 B2 | 10/2003 | Brunfeld | |
| 6,634,762 B2 | 10/2003 | Cilia | |
| 6,637,676 B2 | 10/2003 | Zieger et al. | |

| | | | |
|---|---|---|---|
| 6,644,561 B1 | 11/2003 | Daane | |
| 6,655,812 B2 | 12/2003 | Parker et al. | |
| 6,659,622 B2 | 12/2003 | Katogi et al. | |
| 6,669,352 B2 | 12/2003 | McKinney | |
| 6,712,494 B1 | 3/2004 | Hodge | |
| 6,741,901 B2 | 5/2004 | Lu et al. | |
| D492,443 S | 6/2004 | Smith et al. | |
| 6,755,349 B2 | 6/2004 | Beidokhti | |
| 6,774,584 B2 | 8/2004 | Lys et al. | |
| 6,776,507 B2 | 8/2004 | Chen | |
| 6,781,329 B2 | 8/2004 | Mueller et al. | |
| 6,788,001 B2 | 9/2004 | Lechner | |
| 6,793,360 B2 | 9/2004 | Goslee | |
| 6,793,362 B2 | 9/2004 | Tai | |
| 6,801,003 B2 | 10/2004 | Schanberger et al. | |
| 6,802,635 B2 | 10/2004 | Robertson et al. | |
| 6,806,659 B1 | 10/2004 | Mueller et al. | |
| D498,857 S | 11/2004 | Smith et al. | |
| 6,811,286 B2 | 11/2004 | Mateescu et al. | |
| 6,817,734 B2 | 11/2004 | Hauck | |
| 6,819,080 B2 | 11/2004 | Barbeau et al. | |
| 6,824,289 B2 | 11/2004 | VanderSchuit | |
| 6,827,464 B2 | 12/2004 | Koren et al. | |
| D501,271 S | 1/2005 | Barbeau et al. | |
| 6,848,822 B2 | 2/2005 | Ballen et al. | |
| 6,851,827 B2 | 2/2005 | Clemente et al. | |
| 6,851,844 B2 | 2/2005 | Guy | |
| 6,854,869 B1 | 2/2005 | Fernandez | |
| 6,858,993 B2 | 2/2005 | Lee et al. | |
| 6,863,415 B2 | 3/2005 | Lu | |
| 6,869,202 B2 | 3/2005 | Tufte | |
| 6,869,204 B2 | 3/2005 | Morgan et al. | |
| 6,874,909 B2 | 4/2005 | Vanderschuit | |
| 6,880,948 B2 | 4/2005 | Koch | |
| 6,897,624 B2 | 5/2005 | Lys et al. | |
| 6,902,301 B2 | 6/2005 | Kieronski | |
| 6,929,379 B2 | 8/2005 | Clemente et al. | |
| 6,935,760 B2 | 8/2005 | Bar-Cohen | |
| 6,936,000 B2 | 8/2005 | Flugger | |
| 6,936,978 B2 | 8/2005 | Morgan et al. | |
| 6,948,841 B2 * | 9/2005 | Tsai | 362/565 |
| 6,953,276 B2 | 10/2005 | Graham | |
| 6,955,440 B2 * | 10/2005 | Niskanen | 362/96 |
| 6,955,443 B2 | 10/2005 | Solowiej | |
| 6,956,338 B1 | 10/2005 | Clark et al. | |
| 6,965,205 B2 | 11/2005 | Piepgras et al. | |
| 6,966,666 B2 * | 11/2005 | Liu | 362/101 |
| 6,967,448 B2 | 11/2005 | Morgan et al. | |
| 6,969,954 B2 | 11/2005 | Lys | |
| 6,995,355 B2 | 2/2006 | Rains et al. | |
| 7,014,336 B1 | 3/2006 | Ducharme et al. | |
| 7,063,432 B2 | 6/2006 | VanderSchuit | |
| D530,040 S | 10/2006 | Smith et al. | |
| 7,192,159 B2 * | 3/2007 | Huang | 362/225 |
| 2002/0113555 A1 | 8/2002 | Lys et al. | |
| 2002/0141058 A1 | 10/2002 | Yoshitaka | |
| 2002/0159257 A1 | 10/2002 | Grajear | |
| 2002/0159258 A1 | 10/2002 | Beeman | |
| 2003/0012025 A1 | 1/2003 | Christen | |
| 2003/0021117 A1 | 1/2003 | Chan | |
| 2003/0028260 A1 | 2/2003 | Blackwell | |
| 2003/0081408 A1 | 5/2003 | Tai | |
| 2003/0090897 A1 | 5/2003 | Su | |
| 2003/0095409 A1 | 5/2003 | Cheng | |
| 2003/0174500 A1 | 9/2003 | Kameda et al. | |
| 2003/0179564 A1 | 9/2003 | Ganci et al. | |
| 2003/0191359 A1 | 10/2003 | McNew | |
| 2003/0229409 A1 | 12/2003 | Shelton et al. | |
| 2003/0233269 A1 | 12/2003 | Griffin et al. | |
| 2004/0032730 A1 | 2/2004 | Ciarrochi, Jr. | |
| 2004/0042201 A1 | 3/2004 | Lee | |
| 2004/0052082 A1 | 3/2004 | Oswald | |
| 2004/0064357 A1 | 4/2004 | Hunter et al. | |
| 2004/0066650 A1 | 4/2004 | Hung | |
| 2004/0066652 A1 | 4/2004 | Hong et al. | |
| 2004/0070972 A1 | 4/2004 | Huang | |
| 2004/0090787 A1 | 5/2004 | Dowling et al. | |
| 2004/0105261 A1 | 6/2004 | Ducharme et al. | |
| 2004/0116039 A1 | 6/2004 | Mueller et al. | |
| 2004/0136177 A1 | 7/2004 | Lewis et al. | |
| 2004/0136189 A1 | 7/2004 | Vanderschuit | |
| 2004/0160199 A1 | 8/2004 | Morgan et al. | |
| 2004/0178751 A1 | 9/2004 | Mueller et al. | |
| 2004/0207997 A1 | 10/2004 | Stewart et al. | |
| 2004/0212992 A1 | 10/2004 | Chen | |
| 2004/0233661 A1 | 11/2004 | Taylor | |
| 2004/0240890 A1 | 12/2004 | Lys et al. | |
| 2004/0246703 A1 | 12/2004 | Adams | |
| 2004/0264195 A1 | 12/2004 | Chang et al. | |
| 2005/0013129 A1 | 1/2005 | Zhang | |
| 2005/0024892 A1 | 2/2005 | Cabrera | |
| 2005/0030744 A1 | 2/2005 | Ducharme et al. | |
| 2005/0035728 A1 | 2/2005 | Schanberger et al. | |
| 2005/0036300 A1 | 2/2005 | Dowling et al. | |
| 2005/0040774 A1 | 2/2005 | Mueller et al. | |
| 2005/0044617 A1 | 3/2005 | Mueller et al. | |
| 2005/0062440 A1 | 3/2005 | Lys et al. | |
| 2005/0078472 A1 | 4/2005 | Wiest | |
| 2005/0087255 A1 | 4/2005 | Humphrey et al. | |
| 2005/0099304 A1 | 5/2005 | Humphrey | |
| 2005/0135113 A1 | 6/2005 | Wang et al. | |
| 2005/0141214 A1 | 6/2005 | Fotherby | |
| 2005/0151489 A1 | 7/2005 | Lys et al. | |
| 2005/0157487 A1 | 7/2005 | Epstein | |
| 2005/0157490 A1 | 7/2005 | Klose | |
| 2005/0162851 A1 | 7/2005 | Kazar et al. | |
| 2005/0174473 A1 | 8/2005 | Morgan et al. | |
| 2005/0195596 A1 | 9/2005 | Van Brocklin et al. | |
| 2005/0195598 A1 | 9/2005 | Dancs et al. | |
| 2005/0201118 A1 | 9/2005 | Hirokazu | |
| 2005/0207159 A1 | 9/2005 | Maxik | |
| 2005/0213314 A1 | 9/2005 | Mochiachvili et al. | |
| 2005/0236998 A1 | 10/2005 | Mueller et al. | |
| 2005/0248299 A1 | 11/2005 | Chemel et al. | |
| 2005/0253533 A1 | 11/2005 | Lys et al. | |
| 2005/0254232 A1 | 11/2005 | Bently et al. | |
| 2005/0254241 A1 | 11/2005 | Harwood | |
| 2005/0264261 A1 | 12/2005 | Barbeau et al. | |
| 2006/0002110 A1 | 1/2006 | Dowling et al. | |
| 2006/0012987 A9 | 1/2006 | Ducharme et al. | |
| 2006/0016960 A1 | 1/2006 | Morgan et al. | |
| 2006/0050509 A9 | 3/2006 | Dowling et al. | |
| 2006/0072317 A1 | 4/2006 | Noordhoek | |
| 2006/0076908 A1 | 4/2006 | Morgan et al. | |
| 2006/0087831 A1 | 4/2006 | Kramer | |
| 2006/0092630 A1 | 5/2006 | Kennedy et al. | |
| 2006/0095780 A1 | 5/2006 | Reed | |

FOREIGN PATENT DOCUMENTS

| | | | |
|---|---|---|---|
| EP | 1251721 A1 | 10/2002 | |
| GB | 778438 | 7/1957 | |
| JP | 2002237201 | 8/2002 | |
| JP | 2004342587 A | 12/2004 | |
| WO | WO 03026358 A | 3/2003 | |
| WO | WO 03/078894 A1 | 9/2003 | |
| WO | WO 03/089838 A1 | 10/2003 | |
| WO | WO2004084163 A1 | 9/2004 | |
| WO | WO2005008127 A1 | 1/2005 | |
| WO | WO 2005/095848 A1 | 10/2005 | |

OTHER PUBLICATIONS

PCT/US2007/013946 International Search Report and Written Opinion dated Apr. 2, 2008.

* cited by examiner

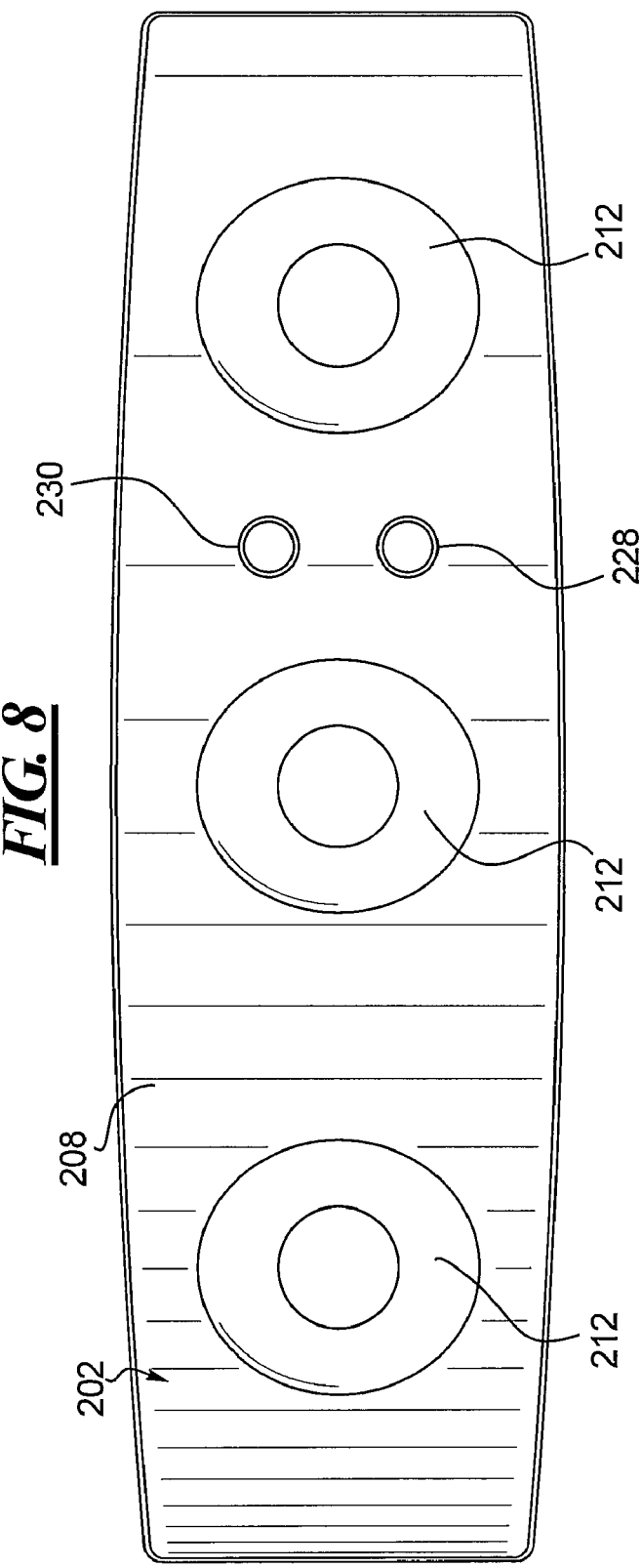
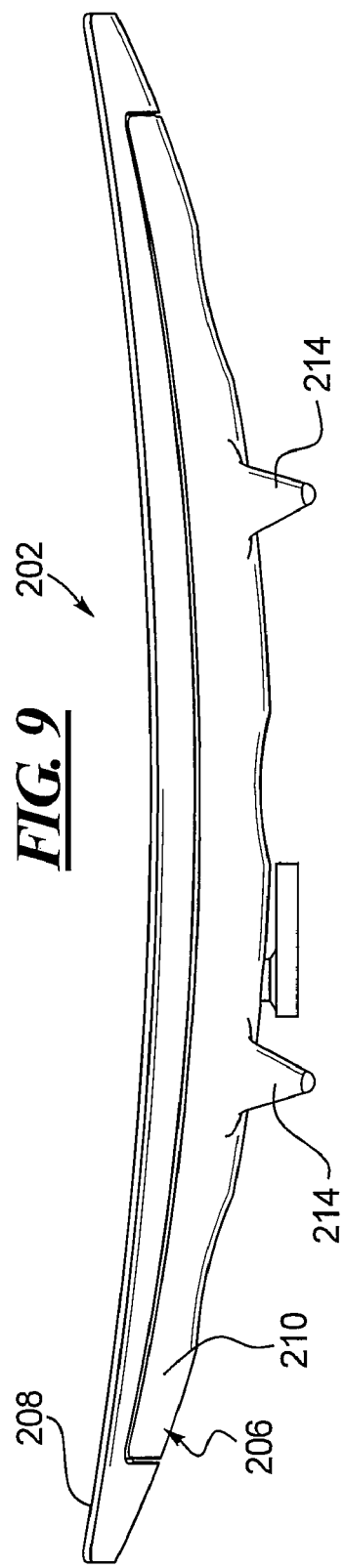
FIG. 8
FIG. 9

DECORATIVE LIGHT SYSTEM

BACKGROUND

1. Technical Field

The present disclosure generally relates to decorative light systems, and more particularly to decorative light systems used as home furnishings.

2. Description of the Related Art

Various decorative illuminated objects are known in the art, which display one or more lighting effects. For example, U.S. Pat. No. 6,801,003 ("Schanberget") discloses lighting systems for swimming pools, wall-mounted lighting systems, and window-mounted light-systems that include a processor that is configured to control a color-changing lighting effect generated by the lighting apparatus Schanberget discloses that the lighting system may also include memory storing one or more lighting programs and/or data. The lighting systems may also include a user interface used to change and/or select the lighting effects generated by the lighting system. Schanberget also discloses that the lighting system may be provided with a plurality of LEDs controlled such that the light outputs from two or more of the LEDs combine to produce a mixed colored light, and that the lighting system may be used in a variety of larger scale applications such as indoor and outdoor displays, decorative illumination, and special effects illumination U.S. Pat. No. 6,536,914 ("Hoelen") discloses an illumination system for illuminating a display device, comprising a light-emitting panel having at least one edge surface for coupling light into the light-emitting panel. The Hoelen illumination system further comprises a light source comprising a plurality of cluster's of light-emitting diodes, each cluster includes one blue, one green, and one red LED. Hoelen uses a mixing chamber with a dimensional relationship to the arrangement of the LED clusters to achieve a uniform, non-dynamic light distribution Other known lighting devices are described in U.S. Pat. No. 6,616,308 which discloses a simulated candle, U.S. Pat. No. 6,361,186 which discloses a simulated neon light using LEDs, while controls for lighting display devices are described in U.S. Pat. Nos. 6,431,719, 4,866,580, and U.S. Patent Publication No. 2004/0036424.

However, there are deficiencies associated with each of the foregoing lighting devices. For example, the known devices have limited applications and are overly difficult and expensive to manufacture. In addition, none of the known devices have communications capabilities to provide a control center remotely from the decorative lighting device Still further, none of the known systems include multiple lighting devices that are wirelessly synchronized to present a coordinated light show. Accordingly, there remains a need in the art for improved decorative lighting displays

SUMMARY OF THE DISCLOSURE

Generally, illuminated, decorative light objects are disclosed that ale capable of generating a light that is substantially uniformly distributed across at least a portion of a housing of the device. In addition, a portable light device is disclosed that is capable of accommodating manufacturing tolerances for each component According to certain aspects of this disclosure, a portable light device includes a housing having at least a translucent portion formed of a translucent material, a first light source disposed within the housing and adapted to generate light, and a first optical structure positioned to direct at least a portion of the light from the first light source toward the housing translucent portion A second optical structure is positioned between the first light source and the housing translucent portion and is adapted to diffuse at least a portion of the light for uniform distribution across the housing translucent portion The light source may be a cluster of light emitting diodes, while the optical structures may comprise diffusers, reflectors, light pipes, or combinations thereof. A reflector may be formed on a substrate that supports the light source, such as a reflective coating applied to a printed circuit board on which the light source is mounted.

According to additional aspects of the present disclosure, a portable light device includes a housing with first and second housing sections, each of the first and second housing sections including at least a translucent portion formed of a translucent material. A printed circuit board is disposed within the housing and is positioned between the translucent portions of the first and second housing sections. A first light source is operably coupled to the printed circuit board, positioned between the printed circuit board and the first housing section translucent portion, and is adapted to generate a first light. A second light source is operably coupled to the printed circuit board, positioned between the printed circuit board and the second housing section translucent portion, and is adapted to generate a second light. A first optical structure is positioned between first light source and the first housing section translucent portion and adapted to direct at least a portion of the first light toward the first housing section translucent portion A second optical structure is positioned between the second light source and the second housing section translucent portion and adapted to direct at least a portion of the second light toward the second housing section translucent portion. A first diffuser layer is positioned adjacent the first housing section translucent portion and is formed of a semi-opaque material A second diffuse layer is positioned adjacent the second housing section translucent portion and is formed of a semi-opaque material.

According to further aspects of the present disclosure, a portable light device includes a housing having upper and lower housing sections, the housing having at least a translucent portion formed of a translucent material, an upper diffuser layer extending across an interior surface of the upper housing section, and a reflector ring having an outer shoulder adapted to receive a peripheral edge of the upper diffuser layer and an inner shoulder. A printed circuit board is sized for insertion into the diffuser ring inner shoulder, and a light source is operably coupled to the printed circuit board. A lower diffuser layer encloses a lower surface of the printed circuit board and has a peripheral edge engaging a lower surface of the diffuser ring A resilient gasket is disposed within the housing.

A better understanding of these and other features and advantages may be had by reference to the drawings and to the accompanying description, in which preferred embodiments are illustrated and described,

BRIEF DESCRIPTION OF THE DRAWINGS

FIG. 8 is a top plan view of a base used in the light system of FIG. 8;

FIG. 9 is a side elevation view of the base of FIG. 8;

Throughout the figures, like or corresponding reference numerals have been used for like or corresponding parts.

DETAILED DESCRIPTION

Various decorative light system embodiments are disclosed herein including one or more lighted objects removably engageable with a base In certain embodiments, the base includes a light that illuminates an object placed adjacent thereto. In other embodiments, the lighted object includes an illuminating device that is operated by controls stored in the base. In one embodiment, the lighted objects may include a storage vessel and at least one floating light object This embodiment is particularly suited for use with a bathtub, where the storage vessel may contain soap, bath oil, or another product associated with the bath and the floating light object may be placed in the bath tub. In other embodiments, the decorative light system includes a base and one or more portable light devices that may or may not be buoyant The base and portable light devices may include communications components to execute a coordinated light show, as discussed mote fully below.

As used herein, elements described as being "translucent" are those materials permitting the passage of light, including but not limited to clear materials, colored transparent materials, materials that both transmit and diffuse light so that objects beyond cannot be seen clearly, and materials having a combination of these characteristics.

As used herein, the term "mean light direction" refers to the approximate average direction of the sum of all light rays traveling through the housing.

As used herein, the term "lambertian" refers to a surface capable of perfect light diffusion, or light diffusion that is equal in all directions in accordance with Lambert's Law The term "near-lambertian" refers to a surface capable of excellent light diffusion, or light diffusion that is nearly equal in all directions.

Figure 1:
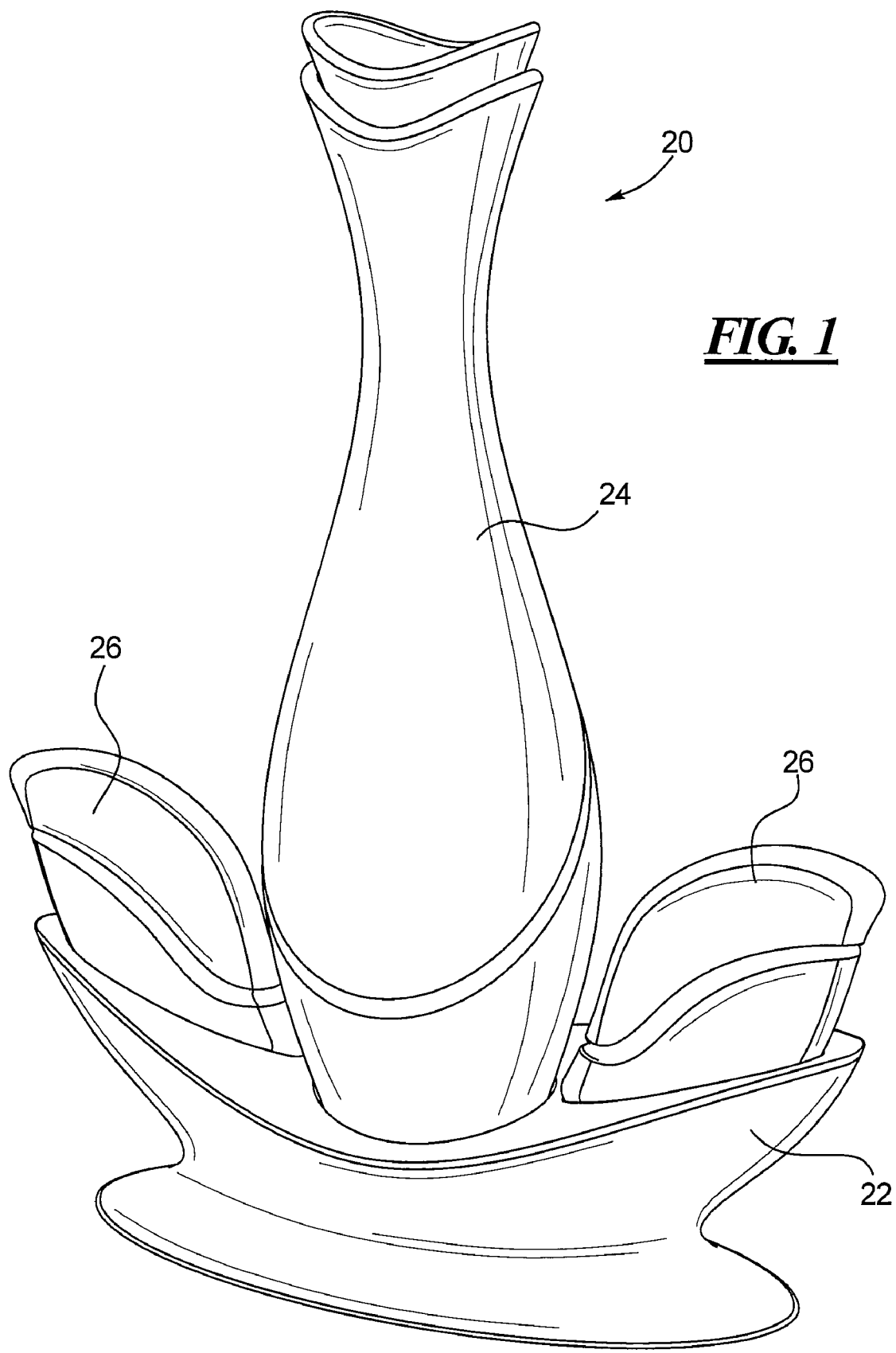
FIG. 1 is a perspective view of a light system according to one disclosed embodiment
Figure 2:
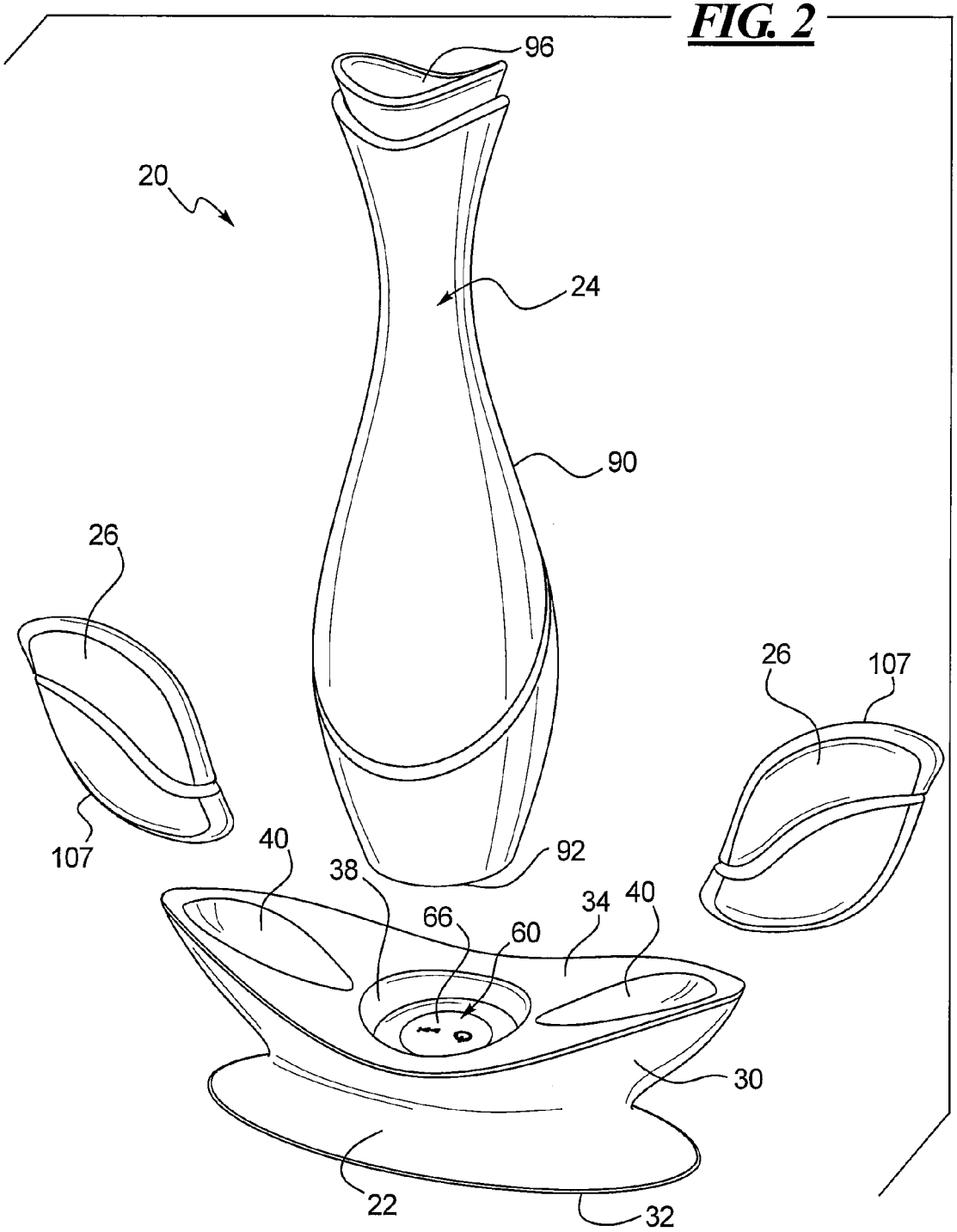
FIG. 2 is a perspective view of the light system of FIG. 1 with a vase and two portable light devices withdrawn from a base.

Certain disclosed light objects include what will hereinafter be referred to as a "light pipe" which may cover an illuminating device and associated structure or which may be used to direct light generated by the illuminating device. In certain arrangements, the light pipe is shaped to closely match the shape of the housing cavity although it is preferably spaced apart from the interior walls of the housing that define the cavity. In other embodiments, the light pipe is positioned with a first end adjacent the illuminating device and a second end adjacent a location to which light is to be directed. In certain embodiments, the light pipe includes either roughened interior or exterior surfaces to aid in light diffusion This roughening of the interior or exterior surface enhances light diffusion A lambertian or near-lambertian surface on the light pipe can be easily achieved by sandblasting or roughening using a conventional scouring pad made from a nylon web and coarse mineral abrasives. Other techniques for roughening the interior or exterior surface of a light pipe or the interior or exterior surface of the light object housing to enhance light diffusion will be apparent to those skilled in the art A decorative light system 20 according to one preferred embodiment is shown in FIGS. 1 & 2. The light system 20 generally includes a base 22, a structure 24 to be illuminated, and portable light devices, such as floating light devices 26. While the illustrated embodiment shows two portable light devices, it will be appreciated that only one or more than two devices may be provided in accordance with the present disclosure. Furthermore, the base may be provided with just the structure 24 without any floating light devices 26 or, alternatively, with one or more floating light devices 26 without the structure 24, as will be understood more filly below.

Figure 3:
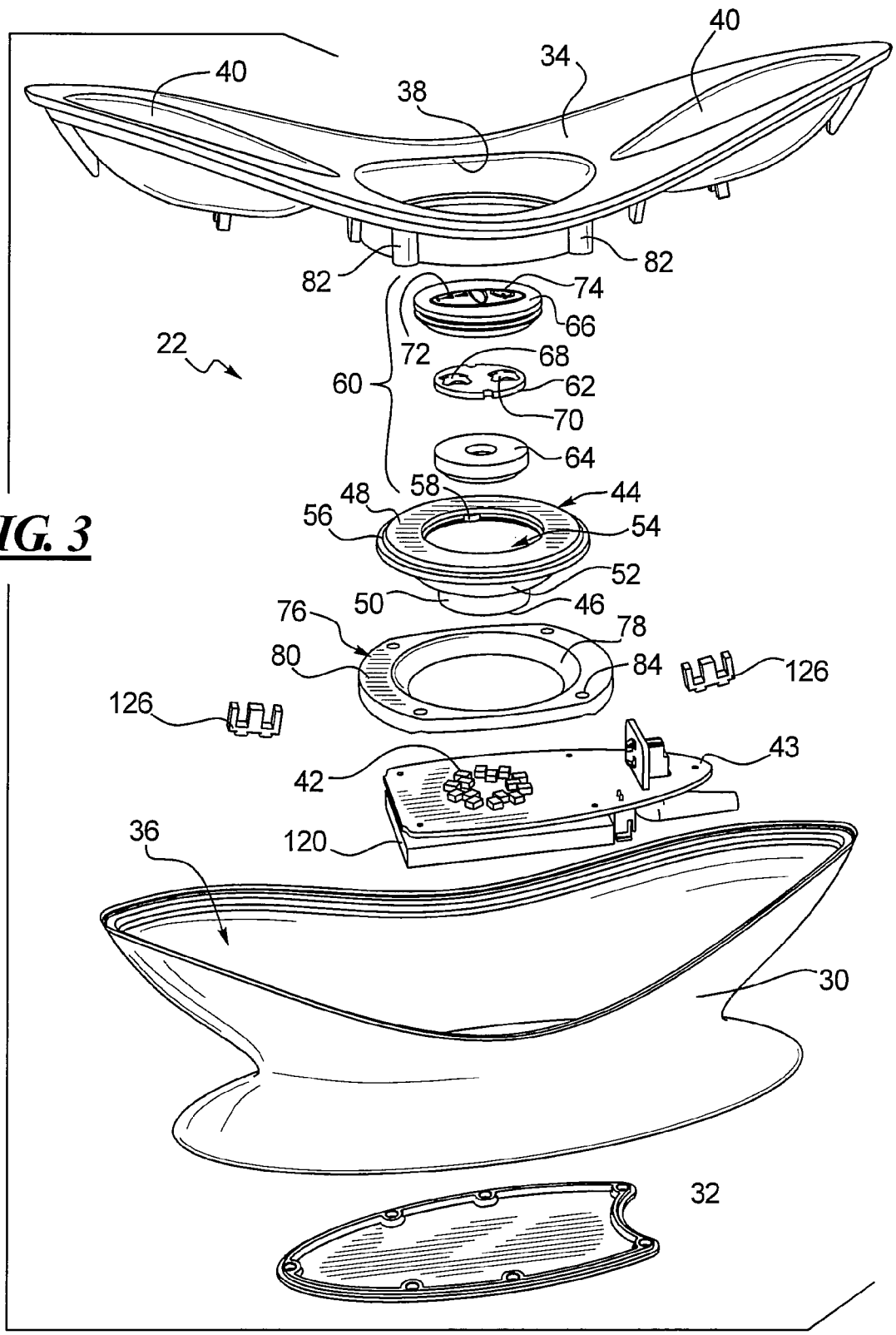
FIG. 3 is an exploded view of a base used in the light system of FIG. 1.

As best shown in FIGS. 2 & 3, the structure 24 and/or floating light device(s) 26 are releasably inserted into the base 22. The base 22 includes a side wall 30, a bottom panel 32, and a top panel 34 to define a base chamber 36. The top panel 34 includes a generally cylindrical receptacle 38 and two generally oval-shaped receptacles 40. The structure 24 has a lower portion sized for insertion into the receptacle 38, while each floating light device 26 has a lower portion sized for insertion into a respective receptacle 40. The receptacles 38, 40 closely fit the structure 24 and floating light devices 26 to support them in an upright position shown in FIG. 1, but do not create such a tight fit so as to cause significant resistance to withdrawal of the devices Returning to FIG. 3, a light source 42 is disposed inside the base chamber 36 for illuminating the structure 24. More specifically, the light source 42 is mounted on a printed circuit board ("PCB") 43 vertically spaced below the base top panel 34. The light source 42 is intended to be capable of producing a plurality of different light shows using a variety of color's, brightness levels, duration times, and other visual qualities Accordingly, in the illustrated embodiment, the light source 42 comprises an array of five cluster's of lights, each cluster including three LEDs, for a total of fifteen LEDs. Each cluster is arranged in a triangle shape with one red, one green, and one blue LED. Of course, any number of cluster's (including a single cluster) of LEDs could also advantageously be used, and/or the number of LEDs in each cluster could be increased or decreased (each cluster may have as few as two LEDs). Moreover, the clusters of LEDs may be arranged in any shape, such as in a line, circle, square, etc, and need not be arranged in a triangle shape. The LED clusters ate capable of generating different colors and intensity levels.

A light pipe 44 is provided for diffusing and directing light from the light source 42 toward the receptacle 38. As best shown in FIG. 3, the light pipe 44 is disposed within the base chamber 36 and has a lower end 46 positioned adjacent the light source 42 and an upper end 48 positioned adjacent the receptacle 38. The light pipe 44 is adapted to diffuse light emitted by the light source 42 into a substantially uniform intensity and direct the light toward the receptacle 38. In the illustrated embodiment, the light pipe 44 is shaped to receive light from a centralized location and direct it to project from the larger diameter, annular shaped upper end 48. Accordingly, the light pipe 44 has a smaller diameter, cylindrical shaped lower portion 50 and a frustoconical shaped upper portion 52 defining the annular upper end 48. The light pipe 44 is positioned in the base 22 so that it directs light from the upper end 48 to a periphery of the receptacle 38. To direct the light in the desired direction, the inner and outer side walls of the light pipe 44 may be coated with a reflective material so that substantially all of the light entering the lower portion 50 is directed to the upper end 48. A center of the light pipe 44 is hollow to define central bore 54. The light pipe 44 also includes an outwardly extending flange 56 and a retaining tab 58

The base 22 includes a user interface in the form of a switch assembly 60 for selectively operating the light system 20. The switch assembly 60 includes a switch board 62, a switch support 64, and a button cover 66, all of which are at least partially disposed within the light pipe central bore 54. In the illustrated embodiment, the switch board 62 includes two switches 68, 70. The support 64 has a frustoconical bottom section engaging the central bore 54 and a planar upper surface engaging a bottom of the board 62. The button cover 66 extends over the board 62 and includes two buttons 72, 74 adapted to actuate a respective switch 68, 70 when depressed. The button covet 66 is preferably made of a resilient material and may include a groove adapted to fit over the retaining tab 58 of the light pipe 44, thereby to secure the switch assembly 60 in position. The switches 68, 70 may be backlit to improve visibility and aesthetics.

As an alternative to the mechanical switches 68, 70 illustrated in FIGS. 2 and 3, the switches may be provided as inductive or capacitive switches that sense the presence of a user's finger to activate the switch. Still further, a touch sensitive switch may be used for the switch 68 so that the system may be turned on or off by touching any part of the base 22.

The light pipe 44 and switch assembly 60 may be fixed to the base top panel 34 to facilitate assembly of the base 22. As shown in FIG. 3, a retainer ring 76 may be provided having a frustoconical surface 78 that is complementary to an exterior side wall of the light pipe 44. The retainer ring 76 further includes a flange 80 extending outwardly and adapted to engage bosses 82 depending from the top panel 34. The bosses 82 may be threaded and the flange 80 may include apertures 84 sized to receive fasteners (not shown). The fasteners may be inserted through the apertures 84 and threaded into the bosses 82 to secure the retainer ring 76 in position. With the retainer ring 76 attached to the top panel 34, the top panel 34, switch assembly 60, light pipe 44 and retainer ring 76 form a sub-assembly that may be attached to the base side wall 30 as a unit The structure 24 is positionable on the base 22 and adapted to be illuminated by light from the receptacle 38. Accordingly, the structure 24 is formed of a translucent material and includes a side wall 90 and a bottom wall 92 In the illustrated embodiment, the structure 24 is formed as a holding vessel, such as a vase A stopper 96 is provided for closing an open top of the structure 24, and may be adapted to form a hermetic seal with the structure 24. As best understood with reference to FIG. 2, a bottom portion of the structure 24 is sized to closely fit the receptacle 38 formed in the base top panel 34. Moire specifically, a bottom of the side wall 90 is substantially aligned with a periphery of the receptacle, where the light from the light source 42 is directed.

The structure 24 is preferably formed as a light pipe to promote retention of a substantial portion of light within the structure walls, thereby to illuminate the structure 24. Once light enters the structure side wall 90, it is transmitted throughout the structure 24. Most of the light intersecting the sides of the structure wall 90 intersects at an angle greater than the critical angle and is, therefore, reflected back into the housing wall, rather than being emitted from the housing Thus, the wall 90 of the structure 24 essentially functions as an optical wave-guide (similar to a light pipe), transmitting a substantial portion of the light within the wall thickness from the light source 42 across the entire structure 24. Of course, most of the light rays are not actually traveling directly from one end of the housing to the other, but the average direction of light travel through the housing, given as the mean light direction, is from the bottom to the top of the structure 24. Moreover, not all of the light in the wall of the structure 24 stays within the wall. Some of the light is allowed to escape and is emitted through the wall 90 of the structure 24 both internally toward internal spaces within the wall 90 and externally to the surrounding environment.

When provided in the form of a vessel, the structure 24 may be used to hold a variety of items. The structure may hold liquids (such as bath oils, soaps, and potable beverages), solids (such as beads, marbles, rocks, granular materials such as powders, or other materials), or combinations thereof (such as bath beads having a solid exterior enclosing liquid contents, flower's and water, etc.) As noted above, a portion of the light entering the structure 24 may be directed toward the vessel chamber to illuminate the contents of the vessel.

FIG. 2 also shows the position of the button cover 66 with respect to the structure 24. Specifically, in the illustrated embodiment, the button cover 66 is disposed within the receptacle 38 and is coveted by the structure 24 when placed in the receptacle. Accordingly, to access the button cover, the structure 24 is removed from the receptacle 38. The button cover 66 does not extend to a periphery of the receptacle 38, and therefore does not impede or block light from traveling into the structure 24. While the switch assembly 60 is positioned below the structure 24 in the illustrated embodiment, it will be appreciated that the switch assembly 60 may be placed in alternative locations, some of which that do not require removal of the base 22 for access, without departing from the present disclosure.

Figure 4:
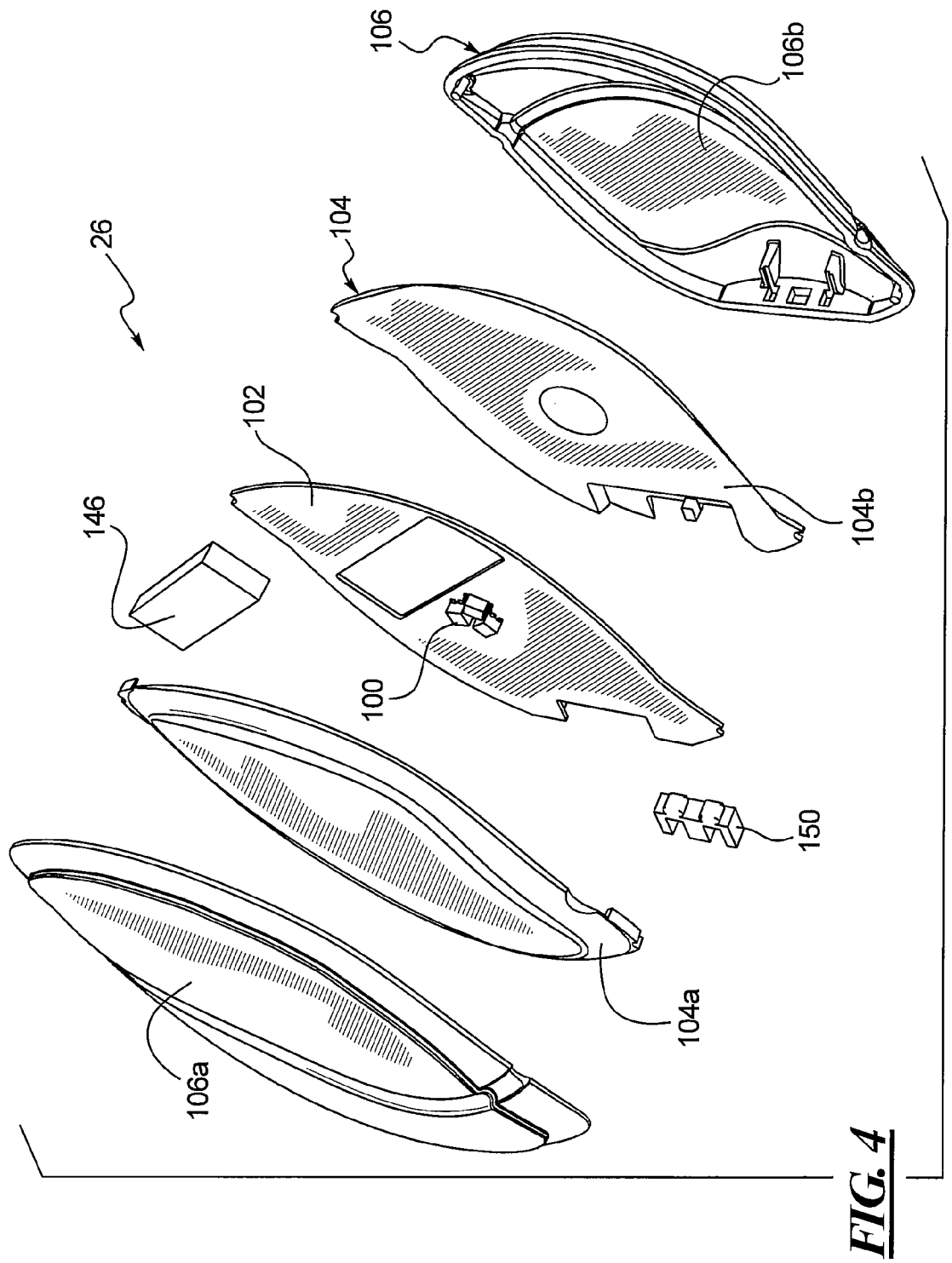
FIG. 4 is an exploded view of a portable light device used in the light system of FIG. 1.

Turning to FIG. 4, an exploded view of a floating light device 26 is provided. Each floating light device 26 includes a light source 100 disposed on a substrate such as printed circuit board ("PCB") 102. The light source 100 is preferably a cluster of red, green, and blue LEDs, similar to the light source 42 described above. The light source 100 is enclosed within a light pipe 104 comprising first and second light pipe sections 104a, 104b. An outer housing 106, comprising first and second sections 106a, 106b, covers the light pipe 104. In the illustrated embodiment, both outer housing sections 106a, 106b are formed of a translucent material and the light pipe 104 diffuses light from the light source 100 and directs it toward both the first and second outer housing sections 106a, 106b. It will be appreciated, however, that the light pipe 104 and housing 106 may be formed so that only a selected portion of the outer housing 106 emits light.

The light pipe 104 may include a roughened inner surface or a roughened outer surface to serve two purposes. First, the roughened light pipe can serve as a light diffuser which helps the lighted object to "glow." Second, the roughened light pipe can effectively hide the electrical components such as the lights 100 and PCB 102. The roughening can be performed by a sandblasting function or a simpler mechanism, such as using conventional sandpaper, scouring pads, steel wool, etc. One preferred methodology involves using a nylon web/abrasive mineral product sold under the SCOTCHPLY™. Various other means for roughening one or more of the surfaces will be apparent to those skilled in the art. The roughened light pipe 104 forms a lambertian or near-lambertian surface that effectively diffuses the light passing through it to produce a desirous glowing effect.

The outer housing sections 106a, 106b are joined with a liquid-tight seal to prevent liquid from entering an interior of the housing 106. Each floating light device 26 is buoyant, and therefore has an overall density that is less than that of the liquid in which it is placed for use. In particular, where the floating light device 26 is used in a bathtub full of water, the device 26 has density less than water The device 26 is preferably shaped and weighted so that it floats in a horizontal orientation, with the first housing section 106a pointing upward and the second housing section 106a pointing downward into the liquid. The construction of both floating light devices 26 shown in FIGS. 1 & 2 is substantially identical, except for the outer housings which are mirror images of one another.

Electronics are provided in the base 22 and floating light devices 26 for operating the light sources 42, 100. With respect to the base 22 and with reference to FIGS. 3 & 5, the base light source 42 is operably coupled to a driver, such as LED driver 110. The LED driver 110, in turn, is coupled to a microcontroller 112 for controlling operation of the light source 42. The microcontroller 112 is operably coupled to a memory 114, which stores a plurality of preprogrammed light shows for display by the light source 42. One or more permanent memories may be used as the memory 114 Preferably, the memory 114 comprises a MAXIM™ DS2506-UNW by Dallas Semiconductor (http://www.maxim-ic.com/) or a Microchip 24LC00, manufactured by Microchip Technologies, of Chandler, Ariz., or an Atmel AT25F512 memory, manufactured by Amtel Corporation, of San Jose, Calif. In other embodiments the memory 114 may be a memory chip or card detachable from the light system 20 and microcontroller 112, so that the light shows stored therein may be removed and replaced with other memory cards/chips. In this manner, the user can purchase new memories over time, to continually update the light object with new and different light shows The microcontroller 112 accesses the memory 114 in response to input to the user interface, and implements one or more light shows, based on the data stored in the memory 114. Microcontroller 112 preferably comprises an Atmel Mega8 processor, manufactured by Armtel Corporation, located in San Jose, Calif., and may have onboard program memory of its own and/or external program memory containing the other stored logic with instructions for interpreting the light show data stored in the memory 114. However, other processors could alternatively be used. It will be apparent to those of ordinary skill in the art that various other memories and/or controllers can be used depending on various design considerations, such as the amount of memory required, processing speed, size, re-propgammability, and the like The plurality of light shows may include the display of various colors, color changes, different speeds of color change, different combinations of displayed colors, and the like. Examples of light shows that can be stored in the memory 114 and the data corresponding thereto, are described in more detail in the related provisional application entitled "Method and Apparatus for Storing and Defining Light Shows", Ser. No. 60/641,441, filed on Jan. 6, 2005, the contents of which are incorporated herein by reference.

Figure 5:
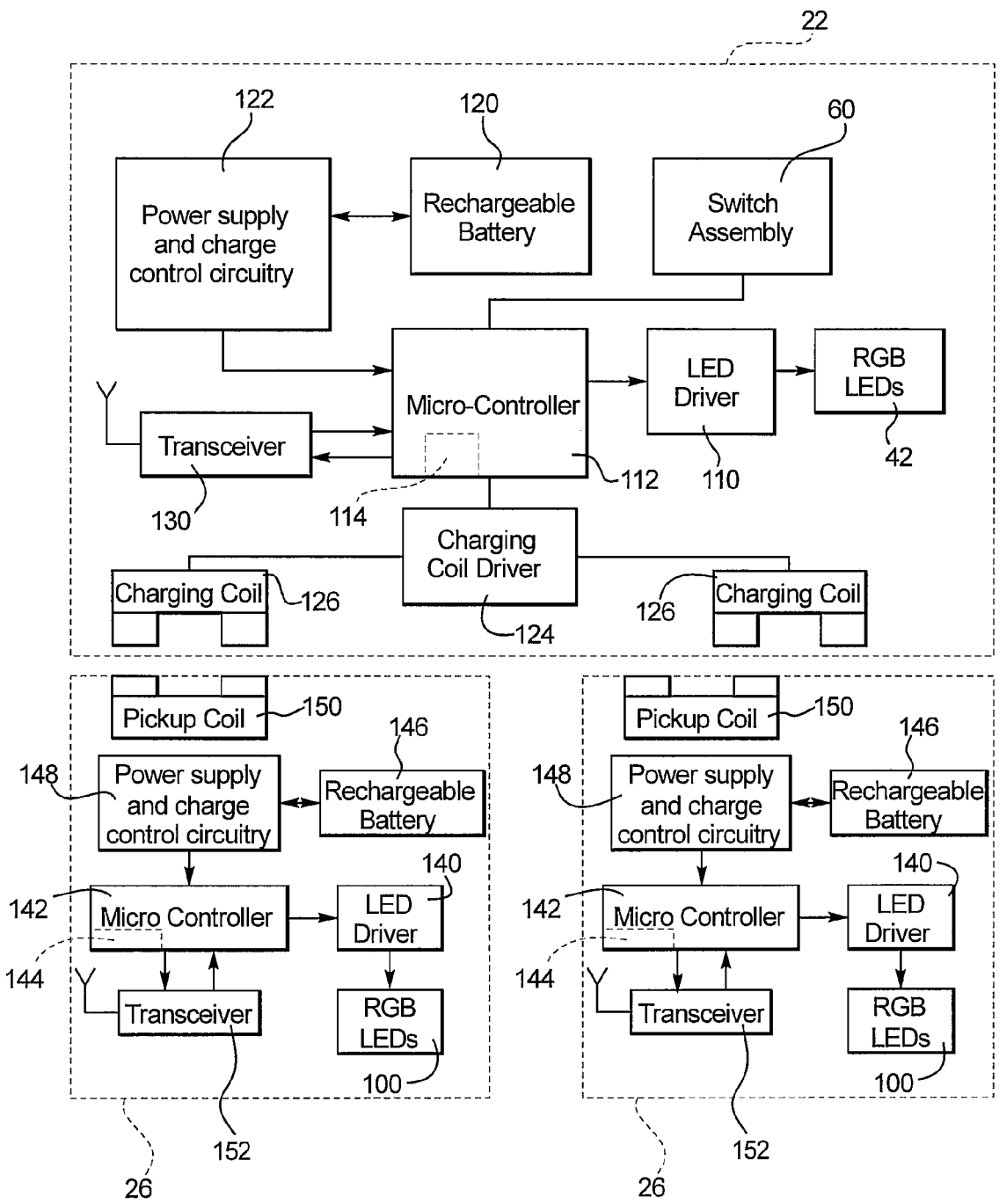
FIG. 5 is a schematic block diagram of the electrical components of the light system of FIG. 1.

Returning to the electronics of the base 22, a power source 120 and associated power supply and charge control circuitry 122 are operably coupled to the microcontroller 112. In the illustrated embodiment, the power source 120 comprises a rechargeable battery. The power supply and charge control circuitry 122 monitors and controls operation of the battery Recharging may be accomplished external to the base 22 or while the batteries are still installed in the base 22 by the use of a conventional, in-unit charging apparatus (not shown). Alternatively, power could instead be supplied from a wall socket with the provision of a power cold and a conventional power converter, transformer, and the like The base 22 may also include components for delivering power to external objects, such as the floating light devices 26. As shown in FIG. 5, the base 22 includes a charging coil driver 124 operably coupled to the microcontroller 112. Two charging coils 126, capable of delivering power to a receiving unit, are coupled to the charging coil driver 124. In the currently preferred embodiment, the charging coils 126 are inductive charging coils. The charging coil driver 124 operates the charging coils 126 according to signals received from the microcontroller 112.

The base 22 may also include communications components to send controls and receive feedback from other objects, such as the floating light devices 26. In the illustrated embodiment, a transceiver 130 is operably coupled to the microcontroller 112, as best shown in FIG. 5. The transceiver 130 is capable of sending signals as instructed by the microcontroller 112 and to receive signals from other objects and forward them to the microcontroller 112 for processing. In addition, FIG. 5 illustrates that the switch assembly 60 is also operably coupled to the microcontroller 112.

Each floating device 26 includes electronics for operating the associated light source 100. As best shown in FIG. 5, each light source is coupled to a driver, such as LED driver 140. The LED driver 140 is operably coupled to a microcontroller 142, which may include or be coupled to a memory 144. The memory 144 may include one or more permanent or removable memories, as described above with respect to the base memory 114. The microcontroller 142 generates signals to operate the LED driver 140, thereby illuminating the light source 100 as desired Each floating light device 26 may also include a power source 146 and associated power supply and charge control circuitry 148 operably coupled to the microcontroller 142. In the illustrated embodiment, the power source 146 comprises a rechargeable battery. The power for charging the battery may be supplied by a pickup coil 150 coupled to the power circuitry 148. The pickup coil 150 may be an inductive coil. The pickup coil 150 receives charge when it is placed sufficiently close to an energized charging coil 126 in the base 22, such as when the floating light device 26 is positioned in the appropriate receptacle 40.

The floating light devices 26 further include components for communicating with the base 22. In the illustrated embodiment, each device 26 includes a transceiver 152 operably coupled to the microcontroller 142. The base and floating light device transceivers 130, 152 communicate on a given protocol, such as a 900 mHz, Bluetooth, or other frequency.

The light system 20 may be operated to selectively illuminate the structure 24 and floating light device 26 as desired The user interface allows a user to select a desired display setting from among a device OFF setting and at least one light show setting in which the light sources 42, 100 are ON. The user inter face includes the control switch 68, by which the user can select between an OFF position, in which none of the light sources is activated, and a light source ON position, in which some or all of the light sources 42, 100 perform one of the plurality of preprogrammed light shows. The user interface also includes the mode switch 70. When the control switch 68 is in the light source ON position, the user can use the mode switch 70 to select a desired light show to display from among the plurality of preprogrammed light shows stored in the memory 114.

A conventional auto-shutoff switch may also be provided to turn the light system 20 off after a predetermined period of time without any user input (e.g., shut off after four hours of no change in setting). Any input to the user interface will turn the light system 20 back on. Alternatively, or additionally, a time used for the auto-shutoff could also be used to cycle through the various preprogrammed light shows and/or illumination modes at predetermined intervals.

The communications capabilities between the base 22 and floating light devices 26 allow the light system 20 to execute a synchronized light show. Because the base 22 and light devices 26 include communications capabilities, the components may send signals to one another related to a light show. In the currently preferred embodiment, where the base 22 and floating light devices 26 each have a transceiver 130, 152, the components are capable of both sending and receiving signals. As a result, the base microcontroller 112 can both send signals to, and receive feedback from, the floating light devices 26 In this manner, the base microcontroller 112 not only deliver control signals to the floating light devices 26 but may also receive feedback that may indicate a fault in one or more of the floating light device components In addition, multiple floating light devices 26 may be synchronized with each other to execute a coordinated light show. Any known synchronizing technique may be employed, such as those described in U.S. Pat. Nos. 6,801,003 and 6,777,891, both of which are incorporated herein by reference.

An external device may be provided to reprogram the base 22 or floating light device 26. The external device may be capable of operatively coupling to the base or floating light device to download a new light show or otherwise reprogram the devices. The operative coupling may be accomplished by various means, such as by wireless communication or inductive coupling.

The floating light devices 26 need not be married to a specific base 22 Instead, the microcontrollers 112, 142 may be programmed so that any device 26 is recognized and synced with the base 22 by docking the device in the base. The syncing process may require the system 20 to be powered off to fully couple a device 26 with the base 22.

While the above embodiment of a light system 20 is described and shown as having a base 22, structure 24, and two floating light devices 26, it will be appreciated that other arrangements may be provided without departing from the scope of the claims Specifically, the base may be provided with only a structure 24 and no floating light devices 26. Alternatively, the base 22 may be provided with a structure 24 and one floating light device 26 or more than two floating light devices 26.

Figure 7:
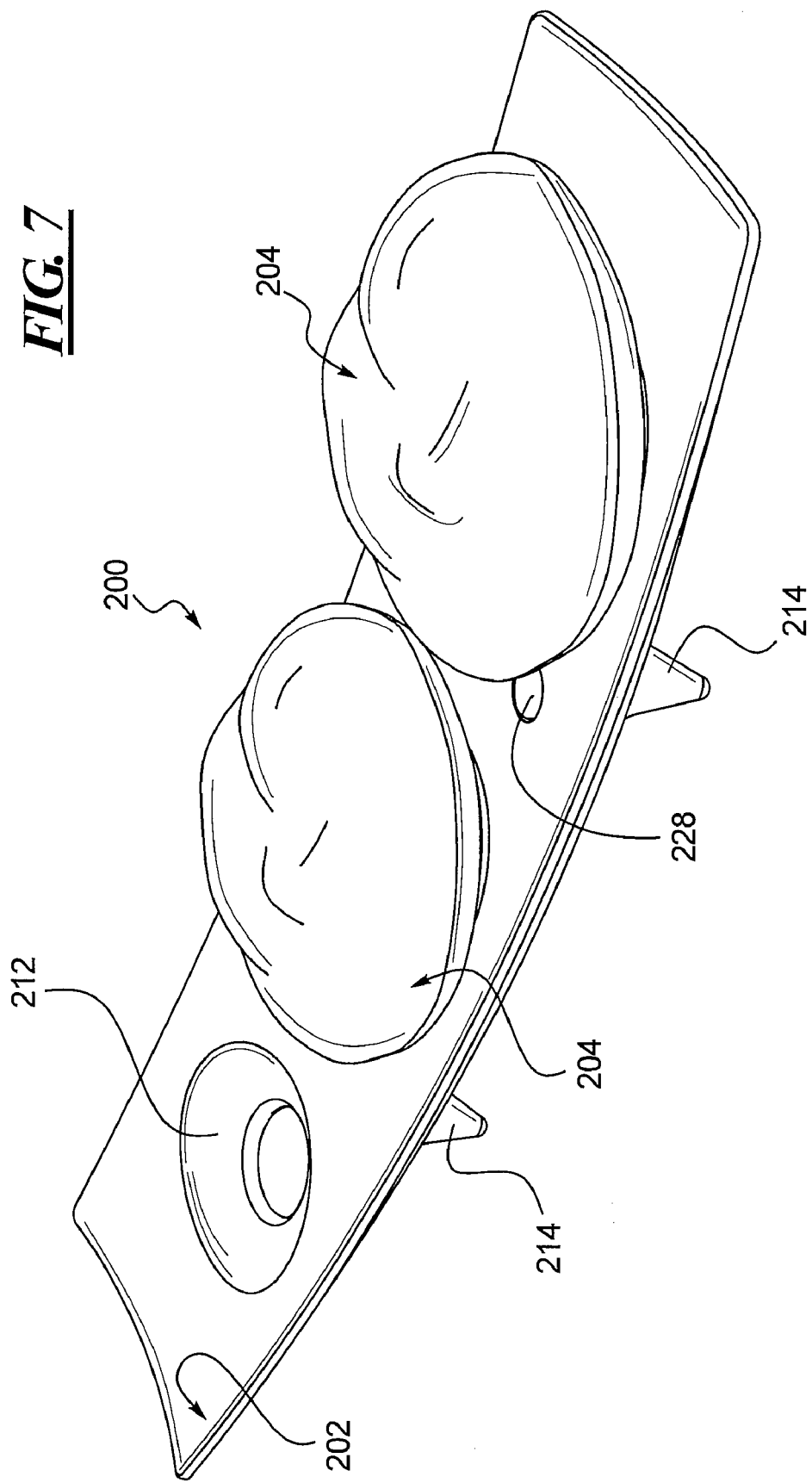
FIG. 7 is a perspective view of a decorative light system according to an alternative embodiment.

As a further alternative, the decorative light system may include a base and one or more portable light devices without an illuminated structure In the embodiment illustrated in FIGS. 7-11, a decorative light system 200 includes a base 202 and three portable light devices 204. The portable light devices 204 may be identical, and therefore only two are shown in FIG. 7. The base 202 includes a housing 206 having a top surface 208 and a bottom surface 210. Three receptacles 212 are formed in the housing top surface 208 and may extend entirely through the housing 206 and bottom surface 210 to define through-holes. Four legs 214 depend from the housing bottom surface 210 for spacing the housing 206 above a support surface.

Figure 11:
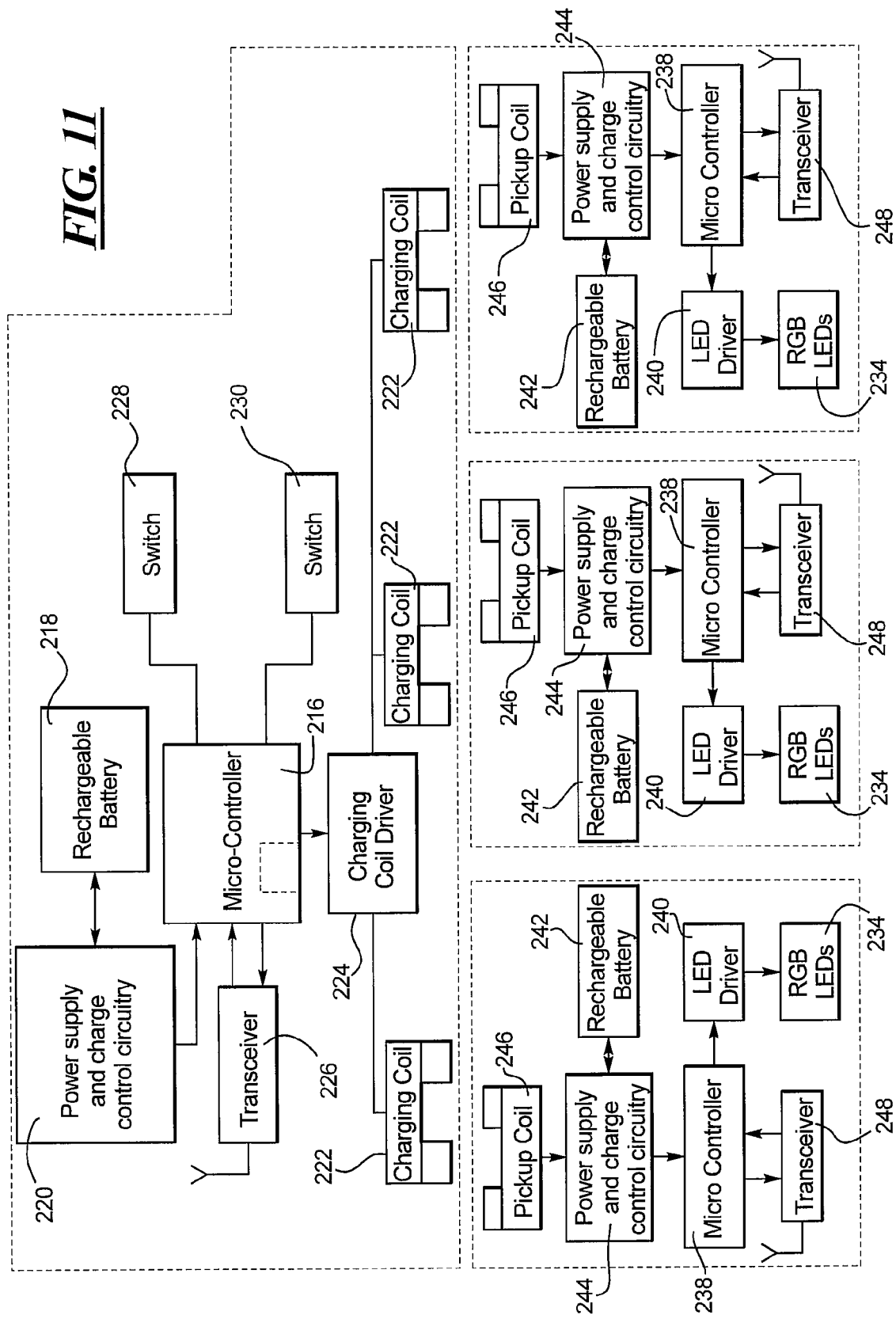
FIG. 11 is a schematic block diagram of the electrical components of the light system of FIG. 8.

The base 202 includes electrical components similar to those of the previous embodiment. As schematically illustrated in FIG. 11, a microcontroller 216 is disposed within the base housing 206. A rechargeable battery 218 is coupled to the microcontroller 216 via a power supply and charge control circuit 220. Three inductive charging coils 222 ate coupled to the microcontroller 216 by a charging coil driver 224. A transceiver 226 is also operably coupled to the microcontroller 216. As best shown with reference to FIGS. 7 and 11, the base 202 also includes switches 228 and 230 for operating the light system 200 and which are operably coupled to the microcontroller 216. Switch 228 may be an ON/OFF switch, while switch 230 may advance or cycle the system 200 through light shows or modes of operation, as better understood below.

The portable light devices 204 are engageable with the base 202 for storage and charging but may be placed remotely from the base 202 for displaying light Each portable light device 204 includes an outer housing or shell 232, at least a portion of which is translucent. The shell may be formed of glass or glass-like plastic, such as polyethylene, which displays favorable impact resistance, flexibility, chemical resistance, and clarity. Other clear plastics, such as polycarbonate, acrylic, styrene, urethanes, or polypropylene may additionally or alternatively be used. Each shell 232 may include an upper shell half 232a and a lower shell half 232b. The lower shell half 232b is sized and shaped for insertion into one of the base receptacles 212. The shell 232 may be formed using any known process, including laser welding using a clear top layer with infrared absorbing backing, silicone overmolding, or other process.

Figure 12:
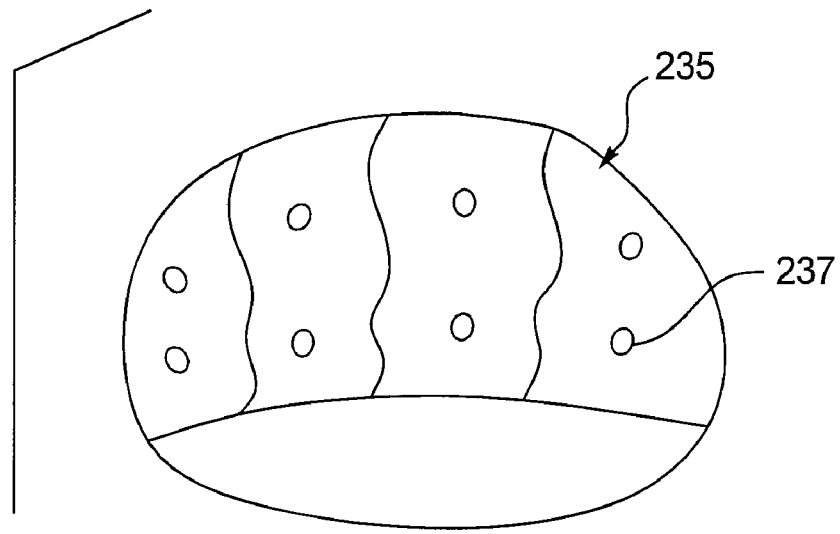
FIG. 12 is a perspective view of a skin usable with a portable light device in the system of FIG. 7.
Figure 12:
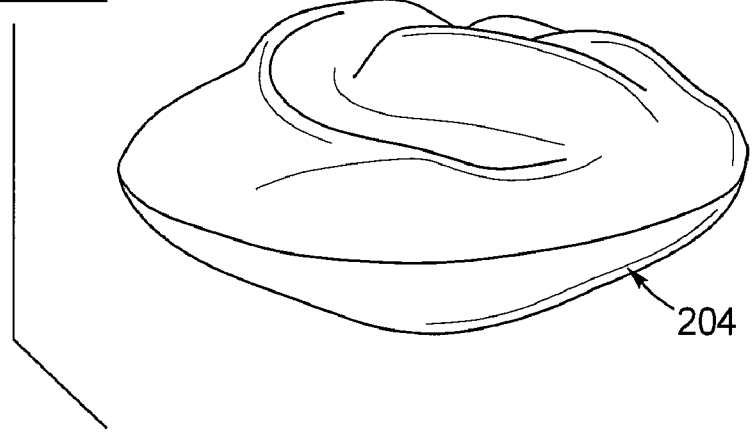

The shell 232 may include a decorative design to improve aesthetics of the portable floating devices 204. In the embodiment illustrated in FIGS. 7 and 10, the shell 232 is molded or bent to form a three-dimensional design that emulates the petals of a flower. Other designs, including substantially two-dimensional graphics, may be used in addition or as an alternative to the design formed by the shell 232. The graphics may be formed directly on the shell 232 or on a substrate that is disposed over the shell 232. As illustrated in FIG. 12, a skin 235 may be provided having the desired graphics disposed thereon. The skin 235 is formed of a heat-shrinkable material so that it may be placed over the portable light device 204 and shrunk to closely fit an exterior surface of the shell 232. The heat for shrinking the skin 235 may be provided by a hair dryer.

A light source is disposed within the shell 232 to radiate light from the portable light device 204. In the illustrated embodiment, first and second light sources, provided as upper and lower clusters of red, green, and blue LEDs 234, 251, are disposed within the shell. The upper cluster of LEDs 234 is mounted on an upper PCB 236, while the lower cluster of LEDs 251 is mounted on a lower PCB 250. The LED clusters generate light that is directed toward the upper and lower halves of the shell 232 to illuminate substantially the entire surface of the shell.

The portable light device 204 may include additional or alternative types of light sources. For example, the device 204 may include an LED projector or a blight LCD screen (similar to those used in cell phones) for projecting a concentrated, brighter beam of light in a desired direction. Where the portable light device 204 is buoyant and disposed in a fluid, the projecting light source may be located either on an upper surface to project onto a ceiling or wall, or a lower surface, to project light into the liquid Either PCB 236, 250 may carry a microcontroller 238 (FIG. 11) that is operably coupled to the light sources by a light source driver 240. A rechargeable battery 242 is coupled to the microcontroller 238 via a power supply and charge circuit 244. The circuit 244 may further be coupled to an inductive receiving coil 246. In the illustrated embodiment, the receiving coil 246 is disposed at a bottom of the portable light device 204. The coil 246 may be thermo-formed and heated a second time to conform the coil to the housing geometry. The receiving coil 246 is preferably positioned within the housing 232 so that it is within the range of the inductive charging coil 222 when the portable light device 204 is placed in the base receptacle 212, thereby to receive a charge that may be transmitted to the rechargeable battery 242. While the exemplary embodiment illustrates the receiving coil 246 as having an annular profile so that it may receive charge regardless of its particular orientation when placed in a receptacle 212, it will be appreciated that the coil may have any shape suitable for receiving a charge. The portable light device 204 further includes a transceiver 248 capable of communicating with the base transceiver 226. Additionally or alternatively, each transceiver 226, 248 may be capable of communicating with existing devices via RF, Bluetooth, or other communications protocol. For example, the transceivers 226, 248 may be compatible with an existing Ethernet or home wireless network.

Similar to the above embodiment, each microcontroller 216, 238 may include a memory for storing a plurality of preprogrammed light shows fox display by the LED clusters 234, 251. The memory may be permanent or removable, and may comprise a plurality of memories. Each microcontroller 216, 238 may access the respective memory in response to input to the user interface, and implements one or more light shows, based on the data stored in the memory.

A plurality of optical structures ate provided to diffuse light generated by the LEDs 234, 251 to obtain a substantially uniform level of light across the entire surface of the shell 232 and to conceal any internal components or otherwise eliminate shadows that the internal components may cast onto the shell 232. As used herein, "optical structures" include components that affect the direction or quality of light, such as by reflecting, diffusing, directing, or a combination thereof. Such optical structures include diffusers, reflectors, and light pipes. According to the illustrated embodiment, an upper, dome-shaped diffuser 252 encloses the upper cluster of LEDs 234, while a lower light pipe 254 encloses the lower cluster of LEDs 251. In addition, an upper diffuser liner 256 is coupled to an interior surface of the upper shell 232a while a lower diffuser liner 258 is coupled to an interior surface of the lower shell 232b. The upper and lower diffuser liners 256, 258 may be formed of a semi-opaque material that conceals the internal components of the portable light device 204 when not illuminated. The material also promotes diffusion of light when the device 204 is illuminated. To further spread and redirect light toward additional areas of the shell 232, the upper and lower PCBs 236, 250 may be coated with a reflective layer, such as white paint. The diffuser 252, light pipe 254, and diffuser liners 256, 258 ate made of material that redirects and reflects light generated by the LED clusters 234, 251, thereby to more uniformly distribute the light. The optical structures may be formed of any known materials used fox such applications While a particular combination of LED clusters and optical structures ate shown in the illustrated embodiment, it will be appreciated that different combinations of light sources and diffusers, as well as optical structures for directing light other than diffusers, light pipes, and reflectors, may be used without departing from the scope of this disclosure. This may include suspending the light source above a first reflective surface, which may be a reflective coating on a PCB or a separate optical element having reflective and/or diffusive properties, and positioning additional reflector's/diffusers to direct light around the light source to eliminate or minimize any shadow it may cast Alternatively, an array of light sources may be positioned about one or more reflectors and/or diffusers extending upwardly from a PCB so that light is reflected in all directions The light sources and reflectors/diffusers may be positioned and shaped to promote uniform distribution of light.

Figure 10:
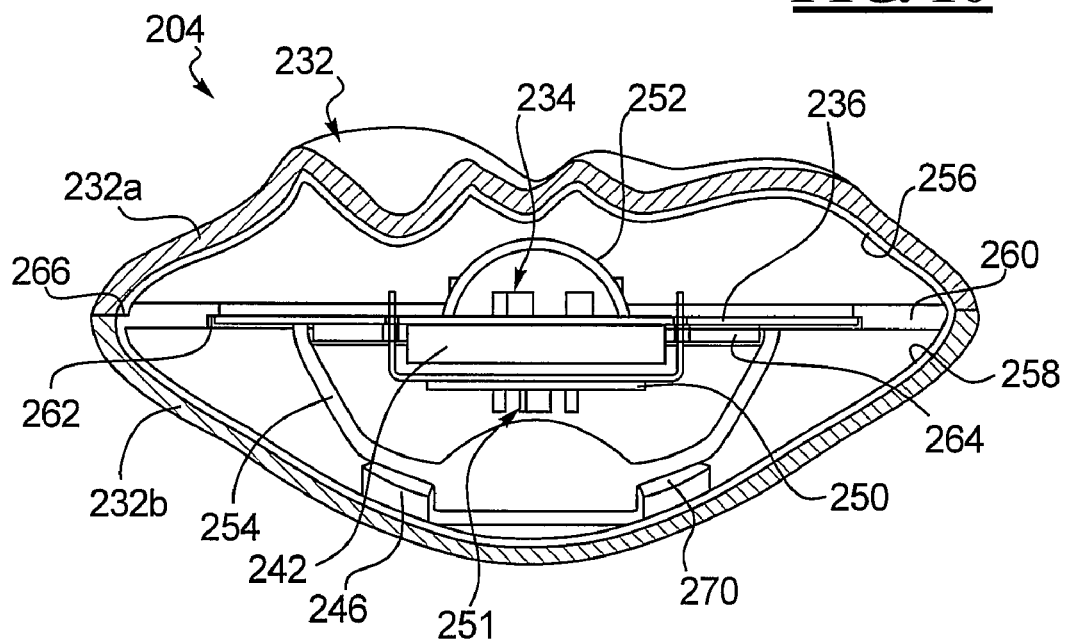
FIG. 10 is a side elevation view, in cross-section, of a portable light device used in the light system of FIG. 8.

Additional structures may be provided to conceal the radial edge of the PCB 236. As shown in FIG. 10, an outer reflector ring 260 is disposed radially outwardly of the PCB 236. Light directed toward the reflector ring 260 is both reflected and diffused to minimize and shadows that may be cast by the PCB 236.

The outer reflector ring 260 may be shaped to facilitate assembly of the portable light device 204. In the illustrated embodiment, the outer reflector ling 260 includes an inner shoulder 262 sized to receive the PCB 236. A spacer ring 264 is also provided to help center the light pipe 254 with respect to the LEDs 234. The reflector ring 260 also includes an outer groove 266 sized to receive a lower edge of the upper diffuser liner 256.

The components of the portable light device 204 may be assembled as a stack of layer's that are compressed or enclosed within the shell 232. Starting with an invented upper shell half 232a, an upper diffuser liner 256 may be inserted into the upper shell halt 232a, and a reflector ring 260 may be inserted onto the upper diffuser liner 256. A PCB 236, with upper dome diffuser 252, LEDs 234, battery 242, and PCB 250 attached thereto as a sub-assembly, may then be inserted into the shoulder 262 of the reflector ling 260. A spacer ring 264 and light pipe 254 may then be placed onto the lower surface of the PCB 236. A receiving coil 246 may be placed on the light pipe 254 and a lower diffuser liner 258 may be placed over the coil and light pipe and into engagement with the reflector ring 260. The lower shell 232b may then be inserted over the lower diffuser liner 258 and sealably coupled to the upper shell 232a. To accommodate manufacturing tolerances that may multiply by the numerous layers of components, a resilient gasket 270 may be disposed within the shell 232 and between two adjacent component layers. In the illustrated embodiment, the resilient gasket 270 is inserted between the coil 246 and light pipe 254.

Visually reactive elements may be provided that interact with light created by the LEDs 234 to create a dynamic, changing, or otherwise unique visual display associated with the portable light device 204. For example, graphics or coloring provided on the housing 232 may include different areas or layer's of compositions that ale responsive to light within different ranges of wavelengths A first area or graphic may be readily visible in red light but obscured or otherwise less visible in other light colors. A second area or graphic may be readily visible in blue light but less visible in non-blue light colors The portable light device may be programmed to execute a light show that includes a sequence of different colored light, including red and blue light Accordingly, when the LEDs display a red light, the first area or graphic is highlighted or more readily visible while the second area or graphic is relatively obscured Conversely, when the LEDs display a blue light, the first area or graphic is obscured while the second area or graphic is more readily visible In this manner; the appearance of the graphics may change as the light show progresses through its programmed sequence.

Several different areas or layers of graphics may be patterned to generate the illusion of a moving or dynamic graphic as the LEDs generate different colors of lights. The graphics may be placed in coordinated positions and illuminated in turn by a particular sequence of lights to create the appearance of a moving display. In addition, the graphics may be directly associated with the portable light device 204, such as by depositing graphics directly on the housing 232 or by forming the graphics on a skin 235 that is then applied to the housing 232. Alternatively, the graphics may be provided on an auxiliary object intended to be illuminated by the portable light device 204, such as a backdrop, accessory, or other item. While the above example describes color-sensitive graphics, it will be appreciated that other compositions may be used to create a dynamic display, such as heat-sensitive pigments and "flop" pigments (i.e., compositions capable of displaying two different colors [instead of a single color that is highlighted or concealed]).

In certain embodiments, the light generated by one or more of the light sources may be matched to a particular material or composition to produce a unique or unexpected visual effect When the structure is provided as a vessel, for example, the contents of the vessel may include a composition that produces a visual effect when illuminated by light having a wavelength within a particular range When the portable devices 26 or 204 are buoyant, they may be placed in a vessel of liquid, such as a bathtub full of water, which also includes a visually reactive composition. In an exemplary embodiment, the visually reactive composition may be a UV absorbing dye that is responsive to light having a wavelength in the UV range to produce a unique visual effect.

External surface treatments may be applied to the housing 232 to achieve a desired effect. For example, where the portable light device 204 is buoyant and used in a bathtub, a layer of soap or bath oil may be applied to the housing 232 outer surface to generate bubbles or condition the bath water. Other surface treatments may be provided in the form of screens having apertures through which the light is projected, thereby to form shaped beams of light that are projected onto surrounding surfaces. The apertures may be formed in any shape, such as circles or stars, and may include a variety of different shapes Still further the surface treatment may include a composition that resists mold, mildew, soap scum, or other undesirable bio-film on the surface of the device.

The external surface treatment may be carried directly by the housing, such as by overmolding the surface treatment onto the housing 232. After use, the device 204 may be sent out for remolding or traded in for a new device carrying the surface treatment. Alternatively, the surface treatment may be carried by a separate substrate that is then applied to the housing 232, such as the shrink-wrap skin 235 discussed above.

It is also anticipated that various other sensors and/or switches could be used to control the disclosed light sources. The portable light device 204, for example, may include sensors to modify operation of the light source A temperature sensor may be provided that measures the temperature of a liquid in which the light is disposed. The microcontroller may receive a temperature signal from the sensor and operate the light source to display a color corresponding to the temperature. For example, a blue light may be generated when the water is below a specified temperature or a red light may be generated when the water is above a specified temperature. Such a sensor is particularly suited for use as a child bathwater warning, to indicate when the water is too hot. Instead of temperature, a light sensor could be provided to turn the system on or off based on ambient light in the room, a sound sensor could be provided to turn the system on in response to detected sounds, a motion sensor could be provided to turn the system on in response to detected motion near the light object, etc. Incorporation of these types of conventional sensors is within the knowledge of one of ordinary skill in the art Therefore, a detailed description of each of these features has been omitted for the sake of brevity.

The sensors may also be used to interact with exterior devices. For example, the sensor may detect the presence of a wireless network and initiate communications with that network. Alternatively, the sensor may detect the presence of auxiliary rechargeable devices, such as a toothbrush or shaver; and modify operation of the charging coil to allow charging of these additional devices.

To further enhance entertainment value, the portable light device 204 may include the ability to generate sound A speaker may be provided for playing selected sounds or music. An MP3 player may be incorporated into the device 204 for storing and playing music. The MP3 player may be coupled to a speaker provided in the device 204, or may wirelessly communicate with remote speakers or headphones Various additional capabilities may be built in to the portable light device 204. For example, the device 204 may include a dispenser; such as a piezo-electric pump, for dispensing soap, bath oil, flagrance, cleaning additive, or other substance. The device 204 may also include one or more heaters to maintain the surrounding environment (such as bathwater) at a desired temperature, or jets for spraying a mist of liquid into the air The device 204 may also incorporate a timer to indicate when a selected period of time has elapsed. Still further, in addition to decorative light, the device 204 may provide other forms of lighting, such as task lighting. The alternative form of light may be generated by the same light source or an additional light source.

Figure 6:
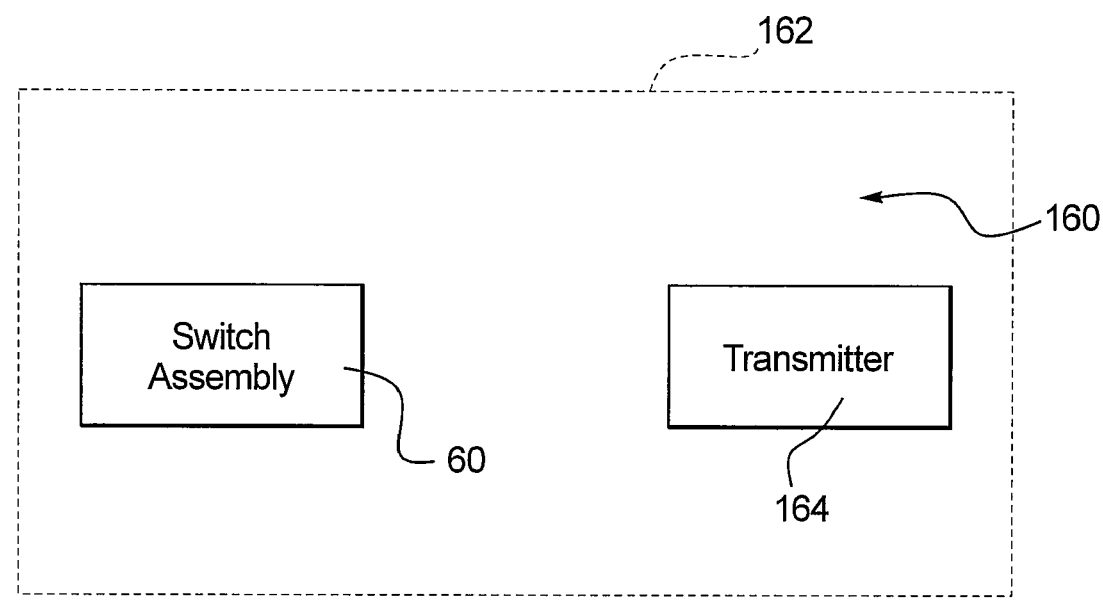
FIG. 6 is a schematic block diagram of an alternative embodiment of the light system having a remote control.
Figure 6:
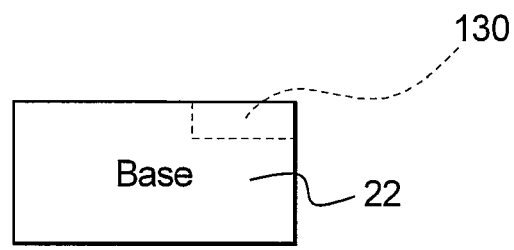

A remote control may be provided for operating the light system. Instead of a permanently mounted user interface as shown in FIGS. 2 & 3, FIG. 6 illustrates a separate or removable wireless interface 160. The interface 160 includes a button configuration and switches similar to that shown in FIG. 2, but is enclosed in a housing 162 that is removable or provided separately from the base 22 to provide a remote control for the light system 20. If the housing 162 is removable, the interface 160 may be the primary control device for the system 20 and, conversely, if the housing is provided separately it may be a secondary control device. The interface 160 may communicate with the base by infrared (IR) or radio frequency (RF) Accordingly, the wireless interface 160 may include a transmitter or transceiver 164 that is communicatively coupled to the base transceiver 130 for wireless communication.

As will be understood from the foregoing, the above systems use portable light devices that may have a variety of specific applications. Where the portable light device is buoyant, it may be used in a variety of places in addition to the bathtub. It may, for example, but used as a decorative object in any vessel of liquid, such as a swimming pool decoration, a tea light, or as a punch bowl decoration. The device may further be only semi-buoyant such that the entire device is below the surface of the liquid.

The portable light devices may be used in various non-liquid applications as well. For example, the portable light devices may be used as candle holders (that may hold real candles), salt and pepper shakers, and wine decanters. The devices may be formed in the shape of food-related vessels, such as plates, trays, bowls, and platters The devices may also be used in beverage glasses and coasters. A plurality of glasses may be stored together in a bar area and may be operated to display a coordinated light show prior to or during use as a vessel. Still further, the portable light devices may be formed as wine stoppers suitable for closing open bottles of wine items intended for use by a particular person, such as a dinner plate or wine glass, may be assigned a specific color or light show that is then displayed by the appropriate portable light device to provide a visual reminder indicating with whom each piece is associated.

The portable light devices have additional home applications outside of the kitchen, food, and beverage items noted above. The devices may be used as an interactive home guide, in which the each device displays a color or show associated with a particular room or area of the house. The colors or shows may be associated with specific directions or commands to encourage specific behavior For example, when the device is carried into an area that is off limits or not intended to receive guests, the device may generate a red light to indicate that the guest should return from that area. The device may also encourage a guest to continue in a desired direction by generating a green light. When used as a guide, the portable light device may be formed as any easily held object, such as a small globe or a drinking vessel. Alternatively, the portable light devices may be used as rechargeable night lights that may be placed as desired throughout the home without limiting placement to existing outlets, as with conventional night lights The base used in the decorative light system may have additional functionality as a universal charger for other devices. The base may be adapted to recharge other objects, such as an electric shavers and toothbrushes, thereby to provide a bathroom suite. The base may also provide a storage location for other non-rechargeable items, such as a hail brush or a drinking cup.

The portable light device also has applications outside the home The portable light device may include an RF or motion sensor that allows use as a security system, where the light will illuminate when triggered. Multiple devices may also be placed along an outdoor pathway to provide walkway lights. The device may further be used as a child safety device, wherein the device illuminates a particular color when the child is moving out of a particular range The devices may also be used with or incorporated into vehicles, such as the spokes of a bicycle or car rims.

Additionally, while the housings of the preferred embodiments awe described as being substantially clear and un-concluded, it may be desirable in some applications to, for example, make the housing of a light object color tinted, to include particles (e.g., reflective particles or material having different refractive index than housing material) or air bubbles suspended in the housing, or the like. The only requirement is that the housing be translucent, as that term is used herein.

While the light sources are shown and described as one or more LEDs or RUB LED arrays, other lighting elements may alternatively be used as the first and second light sources, such as incandescent bulbs, fluorescent bulbs, or the like. Moreover, any number, shape, and size of lighting elements may advantageously be used as the first and second light sources, based on various design considerations such as power consumption, desired light intensity, operating temperature, and the like.

While the switches of the disclosed embodiments ate shown as push-button switches, other types of switches could also be used. In one alternative, one or more of the switches could be activated by touching anywhere on the device, by applying a conductive coating (e.g., Indium Titanium Oxide) to the surface of the housing and/or the base. When the user touches a part of the light object coated with the conductive coating, this would amount to moving the control switch to the next position or cycling the mode switch to the next mode Alternatively, if the base is made of a conductive metal, the touch control could be applied to the base without the need for any conductive coating. In another alternative, one or more of the switches could be rotary switches.

The user interface may also include a dial that indicates the color that the LEDs should be set to for a solid color of any hue. This dial may be labeled with a rainbow that allows the user to select the color that pleases them at any time.

In another alternative, a portion of the program memory containing the light show data onboard the microcontroller and/or memory may be preprogrammed with new light show data via a standard personal computer through a serial, USB, or other known interface.

In yet another alternative, rather than providing a transceiver in each of the base and portable light devices, the base may include a transmitter while the portable light devices include receivers.

The embodiments discussed above are representative of preferred embodiments and are provided for illustrative purposes only. Although specific structures, dimensions, components, etc., have been shown and described, such ate not limiting. The various features and elements of the embodiments can be interchanged, rearranged, omitted, and/or combined in various different combinations to achieve a desired result.

These and other modifications and variations are contemplated within the scope of this disclosure.

INDUSTRIAL APPLICABILITY

Disclosed light systems provide various color changing light shows and/or illumination modes, and systems providing synchronized light shows by a plurality of light devices are also disclosed. The disclosed light systems provide entertainment and decoration and are aesthetically pleasing.

What is claimed:

1. A portable light device comprising:
    a housing having at least a translucent portion formed of a translucent material;
    a first light source disposed within the housing and adapted to generate light, the first light source being disposed in axial alignment with a light pipe that circumscribes the first light source;
    the light pipe positioned to direct at least a portion of the light from the first light source toward the housing translucent portion and to diffuse at least a portion of the light for uniform distribution across the housing translucent portion.

2. The portable light device of claim 1, further comprising a substrate For supporting the first light source.

3. The portable light device of claim 2, wherein the light pipe further comprises a diffuser dome positioned between the first light source and the housing translucent portion, the first light source being disposed between the dome and the substrate.

4. The portable light device of claim 3, further comprising a reflector positioned to direct the light toward the housing translucent portion.

5. The portable light device of claim 4, in which the reflector comprises a reflective coating on the substrate.

6. The portable light device of claim 5, in which the substrate comprises a printed circuit board.

7. The portable light device of claim 3, further comprising a diffuser layer extending across the housing translucent portion.

8. The portable light device of claim 1, in which the light source comprises a cluster of light emitting diodes.

9. The portable light device of claim 1, father comprising a Rechargeable battery disposed within the housing.

10. The portable light device of claim 1, in which the housing is sealed to form a buoyant portable light device.

11. A portable light device comprising:
a housing including first and second housing sections, each of the first and second housing sections including at least a translucent portion formed of a translucent material;
a printed circuit board disposed within the housing and positioned between the translucent portions of the first and second housing sections;
a first light source operably coupled to the printed circuit board and positioned between the printed circuit board and the first housing section translucent portion, the first light source adapted to generate a first light;
a second light source operably coupled to the printed circuit board and positioned between the printed circuit board and the second housing section translucent portion, the second light source adapted to generate a second light;
a first optical structure positioned between first light source and the first housing section translucent portion and adapted to direct at least a portion of the first light toward the first housing section translucent portion;
a second optical structure positioned between the second light source and the second housing section translucent portion and adapted to direct at least a portion of the second light toward the second housing section translucent portion;
a first diffuser layer positioned adjacent the first housing section translucent portion, the first diffuser layer being formed of a semi-opaque material; and
a second diffuser layer positioned adjacent the second housing section translucent portion, the second diffuser layer being formed of a semi-opaque material.

12. The portable light device of claim 11, in which the entire first and second housing sections are formed of the translucent material 13. The portable light device of claim 12, further comprising a third optical structure extending about a periphery of the printed circuit board and adapted to diffuse at least portions of the first and second lights, thereby to conceal a peripheral edge of the printed circuit board.

14. The portable light device of claim 11, in which the printed circuit board includes a reflective layer to direct at least a portion of the first light from the first light source toward the housing first section translucent portion.

15. The portable light device of claim 11, in which the housing is sealed to form a buoyant portable light device.

16. A portable light device comprising;
a housing including upper and lower housing sections, the housing having at least a translucent portion formed of a translucent material;
an upper diffuser layer extending across an interior surface of the upper housing section;
a reflector ling having an outer shoulder adapted to receive a peripheral edge of the upper diffuser layer and an inner shoulder;
a printed circuit board sized for insertion into the diffuser ring inner shoulder;
a light source operably coupled to the printed circuit board;
a lower diffuser layer enclosing a lower surface of the printed circuit board and having a peripheral edge engaging a lower surface of the diffuser ring; and
a resilient gasket disposed within the housing.

17. The portable light device of claim 16 further comprising a second light source operably coupled to the printed circuit board, wherein the first light source is positioned to direct light toward the upper housing section and the second light source is positioned to direct light toward the lower housing section.

18. The portable light device of claim 17, further comprising a light pipe enclosing the second light source, the light pipe including an upper edge engaging the lower surface of the printed circuit board.

19. The portable light device of claim 18, in which the resilient gasket is disposed between the lower diffuser layer and the light pipe.

20. The portable light device of claim 16, further comprising a rechargeable battery operably coupled to the printed circuit board and a charge receiving coil operably coupled to the rechargeable battery, wherein the receiving coil engages the lower diffuser layer and the resilient gasket is disposed between the receiving coil and the light pipe.

* * * * *

UNITED STATES PATENT AND TRADEMARK OFFICE
CERTIFICATE OF CORRECTION

PATENT NO. : 7,458,698 B2 Page 1 of 1
APPLICATION NO. : 11/424481
DATED : December 2, 2008
INVENTOR(S) : Sarah E. Heathcock et al.

It is certified that error appears in the above-identified patent and that said Letters Patent is hereby corrected as shown below:

On the Title Page, Item (57) Abstract, Line 4: replace "translucent material A first" with --translucent material. A first--

Column 16, Line 46: replace "For" with --for--

Column 16, Line 64: replace "father" with --further--

Column 16, Line 65: replace "Rechargeable" with --rechargeable--

Column 18, Line 11: replace "ling" with --ring--

Signed and Sealed this

Seventeenth Day of March, 2009

JOHN DOLL
*Acting Director of the United States Patent and Trademark Office*